US012561038B2

(12) United States Patent
Kodejs et al.

(10) Patent No.: US 12,561,038 B2
(45) Date of Patent: *Feb. 24, 2026

(54) INDUSTRIAL AUTOMATION VISUALIZATION DASHBOARD CREATION PARADIGM

(71) Applicant: Rockwell Automation Technologies, Inc., Mayfield Heights, OH (US)

(72) Inventors: Zdenek Kodejs, Prague (CZ); Matthew Giordano, Powell, OH (US); Damon Purvis, Corona, CA (US); Matthew R. Ericsson, Lyndhurst, OH (US); Benjamin Henderson, Chardon, OH (US); Ashish Anand, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,621

(22) Filed: Aug. 16, 2023

(65) Prior Publication Data

US 2023/0393725 A1 Dec. 7, 2023

Related U.S. Application Data

(63) Continuation of application No. 14/967,874, filed on Dec. 14, 2015, now Pat. No. 11,762,542.

(Continued)

(51) Int. Cl.
*G06F 3/0481* (2022.01)
*G06F 3/04817* (2022.01)
(Continued)

(52) U.S. Cl.
CPC ........ *G06F 3/0481* (2013.01); *G06F 3/04817* (2013.01); *G06F 3/0482* (2013.01);
(Continued)

(58) Field of Classification Search
CPC ............... G06F 3/04847; G06F 3/0482; G06F 3/04842; G06F 3/04845; G06F 3/04817; G06F 2203/04803; G06F 3/0481
See application file for complete search history.

(56) References Cited

U.S. PATENT DOCUMENTS 4,901,221 A 2/1990 Kodosky et al.
6,542,166 B1 4/2003 Washington et al.
(Continued)

OTHER PUBLICATIONS

NI LabVIEW Data Visualization and User Interface Design, Jun. 14, 2013, 6 pages; available at: www.ni.com.
(Continued)

*Primary Examiner* — Mong-Shune Chung

(57) ABSTRACT

Techniques to facilitate visualization of an application associated with an industrial automation environment are disclosed herein. In at least one implementation, a plurality of data items associated with machine operations in the industrial automation environment is presented. A user selection of at least one data item of the plurality of data items is received. Additionally, display instructions comprising display properties of the at least one data item and position information that identifies where to display the at least one data item are also received. The display instructions are processed to render a graphical user interface to the application, wherein the at least one data item is displayed according to the display properties and positioned in the graphical user interface based on the position information.

20 Claims, 21 Drawing Sheets

Related U.S. Application Data

(60) Provisional application No. 62/094,536, filed on Dec. 19, 2014.

(51) Int. Cl.

| | |
|---|---|
| *G06F 3/0482* | (2013.01) |
| *G06F 3/04842* | (2022.01) |
| *G06F 3/04845* | (2022.01) |
| *G06F 3/04847* | (2022.01) |

(52) U.S. Cl.

CPC ...... *G06F 3/04842* (2013.01); *G06F 3/04845* (2013.01); *G06F 3/04847* (2013.01); *G06F 2203/04803* (2013.01)

(56) References Cited

U.S. PATENT DOCUMENTS

| | | | | |
|---|---|---|---|---|
| 8,881,038 | B1 | 11/2014 | Palmer | |
| 9,613,102 | B2 * | 4/2017 | Anand | G06F 16/24578 |
| 9,727,293 | B1 * | 8/2017 | White | G06F 7/10 |
| 9,933,929 | B1 * | 4/2018 | Pitsillides | G06F 3/04842 |
| 11,087,261 | B1 * | 8/2021 | Basu | G06Q 10/0639 |
| 2006/0277479 | A1 * | 12/2006 | Britt | H04L 67/75 |
| | | | | 715/733 |
| 2008/0052637 | A1 * | 2/2008 | Ben-Yoseph | G06F 3/0481 |
| | | | | 715/800 |
| 2008/0109740 | A1 * | 5/2008 | Prinsen | G06F 16/248 |
| | | | | 715/764 |
| 2009/0089225 | A1 | 4/2009 | Baier et al. | |
| 2009/0327883 | A1 * | 12/2009 | Robertson | G06F 16/44 |
| | | | | 707/999.102 |
| 2010/0050097 | A1 * | 2/2010 | McGreevy | G06T 11/206 |
| | | | | 707/E17.014 |
| 2011/0225525 | A1 * | 9/2011 | Chasman | G06F 3/0482 |
| | | | | 715/764 |
| 2012/0017162 | A1 * | 1/2012 | Khokhlov | G06F 9/451 |
| | | | | 715/765 |
| 2013/0120462 | A1 * | 5/2013 | Shuler | G06F 3/1423 |
| | | | | 345/660 |
| 2013/0212129 | A1 * | 8/2013 | Lawson | G05B 11/01 |
| | | | | 707/779 |
| 2014/0058921 | A1 * | 2/2014 | Jezek, Jr. | G06Q 40/04 |
| | | | | 705/37 |
| 2014/0108985 | A1 * | 4/2014 | Scott | G06F 3/0484 |
| | | | | 715/771 |
| 2015/0324391 | A1 * | 11/2015 | Werner | G06F 16/5838 |
| | | | | 707/722 |
| 2015/0339832 | A1 * | 11/2015 | Huang | G01B 11/02 |
| | | | | 345/666 |

OTHER PUBLICATIONS

Rogers, Christina, "Splitter Bar Demo," Jun. 26, 2010, XP054978448; URL: https://youtu.be/WYFKUU5ccQk?t-1m5s; retrieved Jun. 27, 2018; 2 pages.

Travis, Jeffrey, et al., "Lab VIEW for everyone: graphical programming made easy and fun", Jul. 27, 2006, 2 KP055487907, ISBN: 978-0-13-185672-1; URL: http://thesherwoodgang.com/FIRST/2013/Programming/LabVIEW%20For"/o20Everyone.pdf.

* cited by examiner

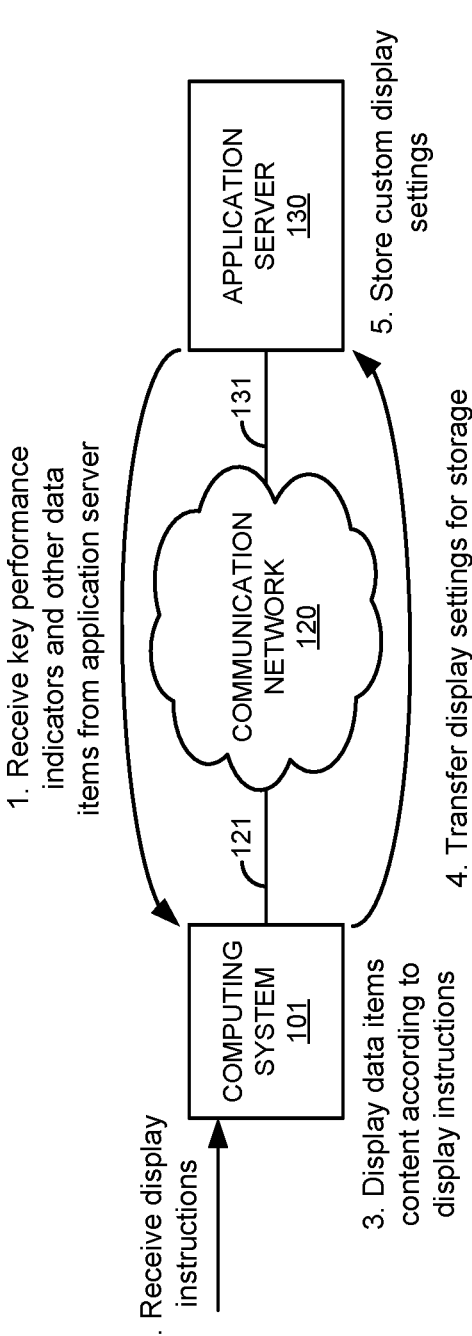
FIGURE 1

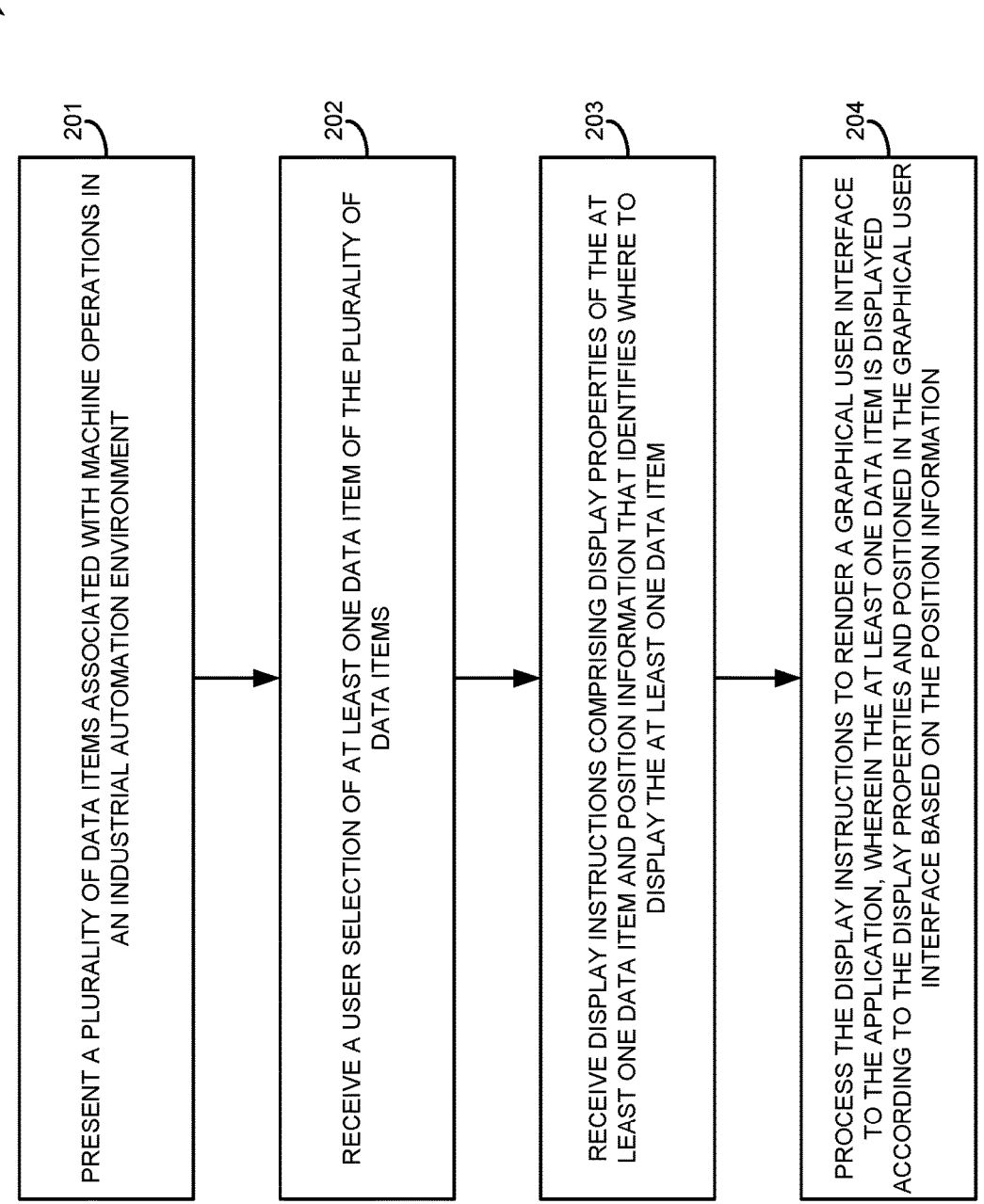

200

201

PRESENT A PLURALITY OF DATA ITEMS ASSOCIATED WITH MACHINE OPERATIONS IN AN INDUSTRIAL AUTOMATION ENVIRONMENT

202

RECEIVE A USER SELECTION OF AT LEAST ONE DATA ITEM OF THE PLURALITY OF DATA ITEMS

203

RECEIVE DISPLAY INSTRUCTIONS COMPRISING DISPLAY PROPERTIES OF THE AT LEAST ONE DATA ITEM AND POSITION INFORMATION THAT IDENTIFIES WHERE TO DISPLAY THE AT LEAST ONE DATA ITEM

204

PROCESS THE DISPLAY INSTRUCTIONS TO RENDER A GRAPHICAL USER INTERFACE TO THE APPLICATION, WHEREIN THE AT LEAST ONE DATA ITEM IS DISPLAYED ACCORDING TO THE DISPLAY PROPERTIES AND POSITIONED IN THE GRAPHICAL USER INTERFACE BASED ON THE POSITION INFORMATION

FIGURE 2

GRAPHICAL DISPLAY 301

COMPUTING SYSTEM 300

GRAPHICAL DISPLAY 401

COMPUTING SYSTEM 400

Create New Display

General

Machine Name: Extruder001

Description: Extruder Machine

Tags

| | |
|---|---|
| Start Command | true |
| Hydraulic Pressure | 88.7 |
| Stroke Length | 78.4 |
| Reservoir Level | 29.5 |
| Cutter Position | 10.0 |
| Batch Number | 72.0 |
| Piece Number | 709 |
| Defects/Batch | .13 |

Model    Widgets

Description:

EXTRUDER MACHINE

Start Command

GRAPHICAL DISPLAY 1101

COMPUTING SYSTEM 1100

—— Cutter Position (m)    - - - Reservoir Level (ft)

INDUSTRIAL AUTOMATION VISUALIZATION DASHBOARD CREATION PARADIGM

RELATED APPLICATIONS

This application is a continuation and claims priority to and benefit of U.S. patent application Ser. No. 14/967,874, filed Dec. 14, 2015, which claims the benefit of, and priority to, U.S. Provisional Patent Application No. 62/094,536, filed Dec. 19, 2014, both of which are hereby incorporated by reference in their entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating the industrial automation environment.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations that continually receive updated operational data from external data sources, which are typically located in the industrial automation environment.

Overview

Provided herein are systems, methods, and software to facilitate visualization of an application associated with an industrial automation environment. In at least one implementation, a plurality of data items associated with machine operations in the industrial automation environment is presented. A user selection of at least one data item of the plurality of data items is received. Additionally, display instructions comprising display properties of the at least one data item and position information that identifies where to display the at least one data item are also received. The display instructions are processed to render a graphical user interface to the application, wherein the at least one data item is displayed according to the display properties and positioned in the graphical user interface based on the position information.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 is a block diagram that illustrates an operation of a communication system in an exemplary implementation.

FIG. 2 is a flow diagram that illustrates an operation of a computing system in an exemplary implementation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for improved visualizations of information items associated with applications executing on a computing system. In one implementation, an application associated with an industrial automation environment may display a graphical user interface showing one or more key performance indicators (KPIs) related to industrial operations. For example, the graphical user interface could display KPIs related to operational data associated with machines in the industrial automation environment, such as parameters, pressures, temperatures, speeds, production rates, or some other status metrics. In some examples, the operational data for some KPIs may comprise dynamic charts or trends, real-time video, or some other graphical content.

By interacting with the graphical user interface, a user may select one or more of the KPIs for display by the application, along with position information that identifies where on the screen to display each of the selected KPIs. In some implementations, the user can also define the size, shape, display style (i.e., gauge, trend, chart, indicator, or some other display type), and other properties of each KPI selected for display. In this manner, the user is able to create a customized display screen that presents the selected manufacturing data in the arrangement and style desired by the user. This custom display layout can be saved so that the visualization of the data as defined by the user may be presented at a later time. When viewing the user-defined display, the application may provide a "live feed" of dynamic KPI data for display according to the arrangement, style, and other properties defined by the user. This feed of dynamic data may be continuously updated by the application so that the visualization shows the most current information associated with each KPI.

Figure 18:
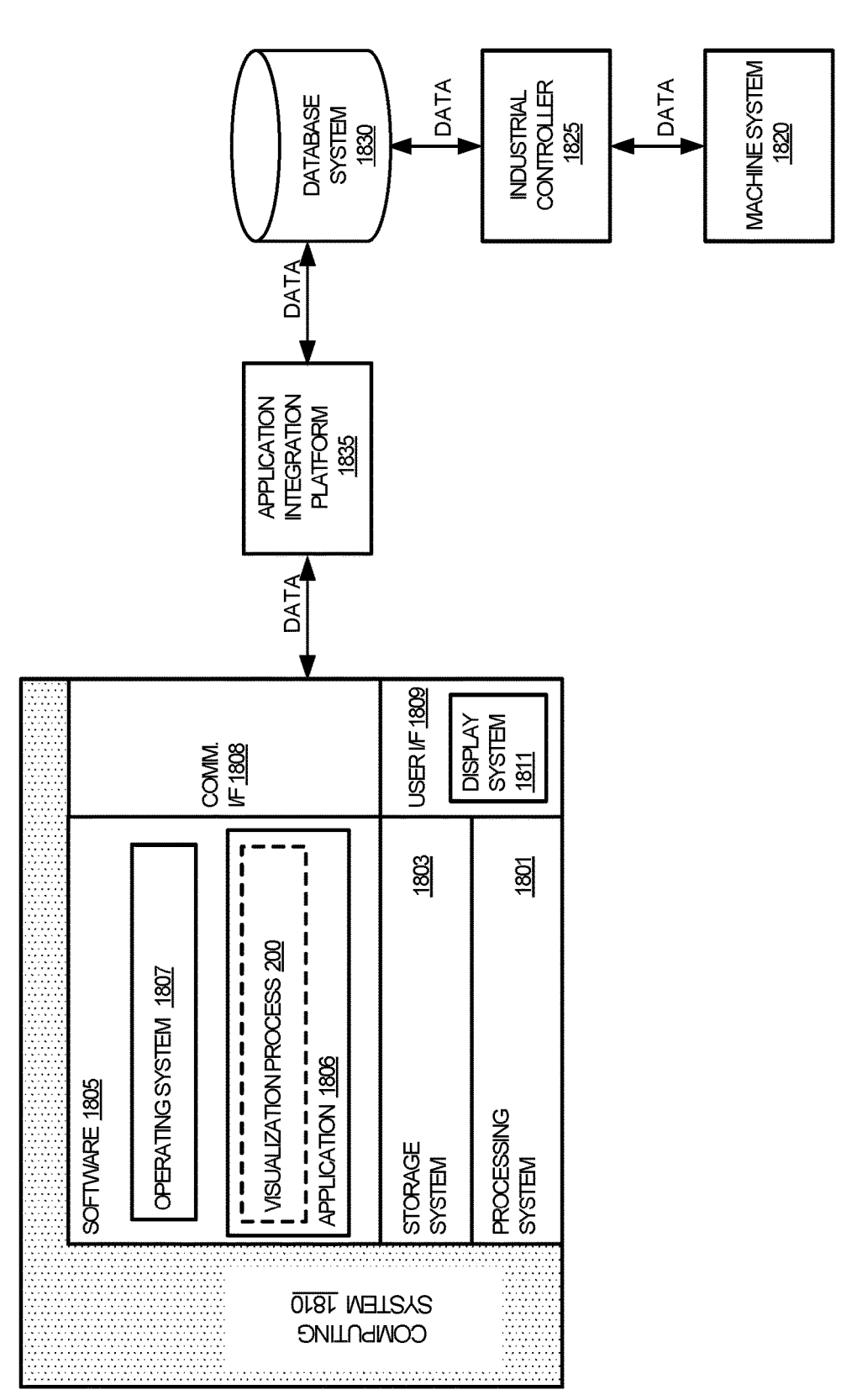
FIG. 18 is a block diagram that illustrates an operational scenario involving a computing system in an industrial automation environment in an exemplary implementation.
Figure 19:
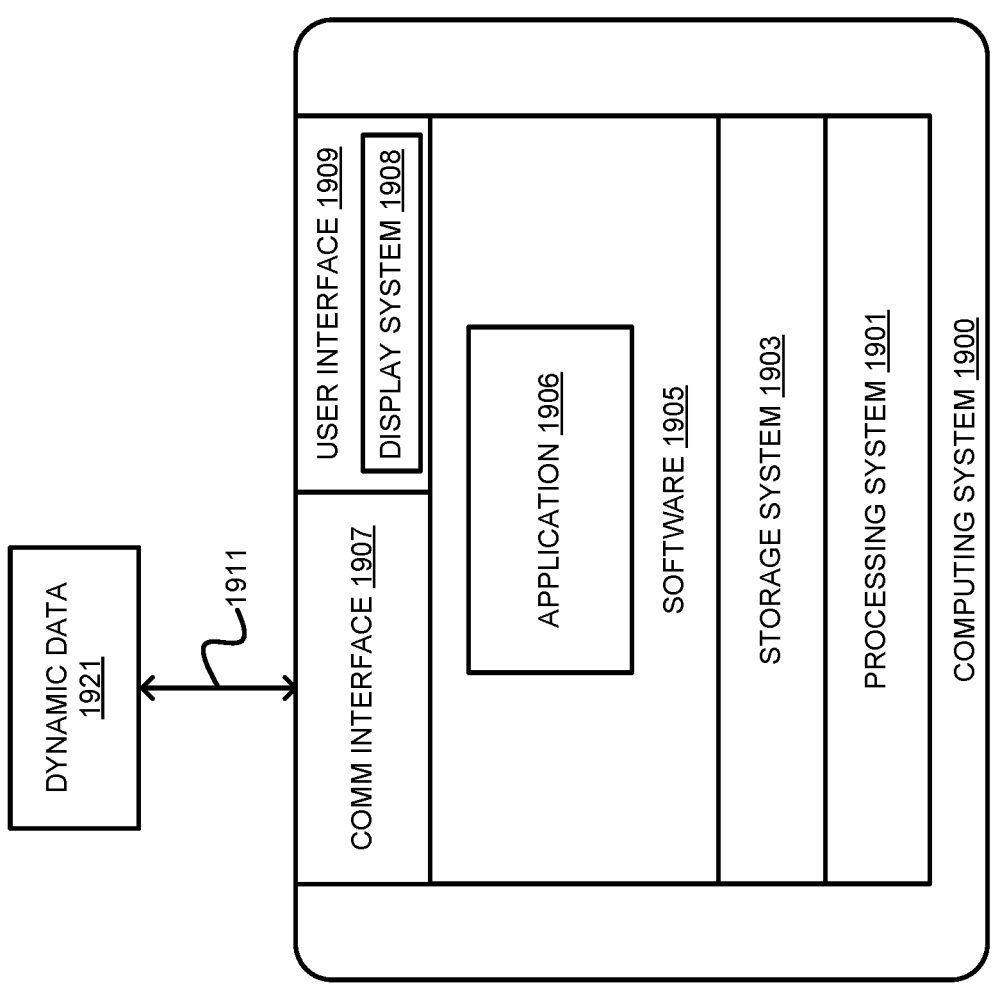
FIG. 19 is a block diagram that illustrates a computing system in an exemplary implementation.

Referring now to the drawings, FIG. 1 illustrates a communication system and an operational scenario in which a computing system receives display instructions to render a graphical user interface to facilitate visualization of an application associated with an industrial automation environment. FIG. 2 illustrates a visualization process that may be performed by a computing system. FIGS. 3-17 illustrate several operational scenarios involving computing systems according to various exemplary implementations. FIG. 18 illustrates an exemplary industrial automation environment that includes a computing system that may be used to execute a visualization process, and FIG. 19 illustrates an exemplary computing system that may be used to perform any of the visualization processes and operational scenarios described herein.

Turning now to FIG. 1, an operational scenario of communication system 100 is illustrated in an exemplary implementation. Communication system 100 includes computing system 101, communication network 120, and application server 130. Computing system 101 and communication network 120 communicate over communication link 121, while communication network 120 and application server 130 are in communication over communication link 131. In some examples, communication network 120 could comprise an on-premise private network or private cloud accessible over a local network connection, a public cloud-based environment accessible over a wide area network such as the Internet, or any other deployment scheme, including combinations thereof.

An exemplary operation of communication system 100 is illustrated in FIG. 1, the order of which is designated by the numerals 1 through 5, but note that the steps could be performed in any order for any operation described herein. In this example, computing system 101 receives content such as key performance indicators and other data items associated with the operation of an industrial automation environment. Computing system 101 also receives display instructions that provide a customized layout of the data items and other content, including what data to display, the style and format for presentation of the data, and the position of the data items on the display, among other configurable options. Computing system 101 then displays the selected data items and other content according to the display instructions. In at least one implementation, the various display settings and configuration may be saved so that user can view the selected data items in the style and arrangement specified by the user. Although they could be saved on computing system 101, the display settings are typically transferred for storage in application server 130 or some other data storage system. In this manner, the user can access and view customized dashboards and display screens for viewing data associated with machines, industrial controllers, and other operations of an industrial automation environment. An exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as visualization process 200 herein. The steps of the operation are indicated below parenthetically. The following discussion of operation 200 will proceed with reference to computing system 101 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate visualization of an application associated with an industrial automation environment. As shown in the operational flow of process 200, computing system 101 presents a plurality of data items associated with machine operations in an industrial automation environment (201). Computing system 101 typically provides the user with a graphical user interface (GUI) to view and interact with graphical content and other data displayed by computing system 101, and in some implementations, the plurality of data items could be presented on this GUI. In some examples, the plurality of data items could be associated with any asset of an industrial automation environment, such as any machine or group of machines, industrial control systems comprising one or more machine controllers, departments or areas of a facility, a team of people responsible for an area of a facility, a work shift, physical barriers such as doors or gates, switches, materials, resources, or any other aspect of an industrial automation environment. In at least one implementation, computing system 101 could retrieve the data items associated with machine operations from application server 130 or some other data storage system associated with the industrial automation environment, but the data items could also be stored locally within computing system 101 and thus retrieved from a local storage system of computing system 101. Some examples of the data items that could be presented by computing system 101 include operational data, machine data, images, screen graphics data, screen captures, video data, sound recordings, production processes, tag data, control information and logic, alarms, notifications, drive configurations, dashboards, human-machine interface (HMI) display screens, key performance indicators (KPIs), charts, trends, and other graphical content, simulation data, version numbers, catalogs, spare parts inventories, maintenance/repair schedules, links to documentation, electrical drawings, manuals, material safety data sheets, various operating procedures, incident reports including problems and solutions, chat transcripts, and any other information associated with the operation of an industrial automation environment. The data items could also include a number of machine stops in a day or during a work shift, summary of overall equipment effectiveness (OEE), summary of key performance indicators, number of users who connected to the asset in a work shift or some other period, modifications to a configuration of the asset, customized reports, and any other statistics or related data associated with the industrial automation environment.

Computing system 101 receives a user selection of at least one data item of the plurality of data items (202). Typically, the user selection of at least one of the data items comprises content associated with the industrial automation environment that the user desires to view in a customized display. The selected data item could comprise any of the data items described above or any other content or information associated with the industrial automation environment. The user typically selects from the plurality of data items presented by computing system 101 as discussed above. For example, a list of available data items could be displayed on the GUI to facilitate receiving the user selection of at least one of the data items. However, the user could provide the user selection of one or more data items by manually identifying them in some implementations.

Computing system 101 receives display instructions comprising display properties of the at least one data item and position information that identifies where to display the at least one data item (203). In some implementations, the display instructions could be received from the user of computing system 101. However, in at least one implementation, the display instructions could be pre-stored and received by computing system 101 from application server 130 or some other network storage system, or received from a local storage system of computing system 101. The display instructions comprise display properties of the selected data items and position information that identifies where to display the data items. The display properties of the data items could include any options and settings the user desires for the display of the data items. For example, the display properties could comprise a type of indicator for the at least one data item, such as a gauge, meter, trend, chart, indicator light, color, icon, graphic, value box, table, report, or any other indicator type. The display properties could also specify other information related to the display of the data items, such as a value source, description, caption, minimum and maximum values, data range, data units, data format, degree of accuracy, display size, orientation, and any other configurable display properties of data items. The display instructions also include position information that identifies where to display the data items on the display. For example, the user may position the data items on the display in any desired arrangement that facilitates quickly gleaning the information presented in the display. The position information could be stored as coordinates, percentages of the display space, or any other data format that provides position information. Other display properties, position information, and additional data may be included in the display instructions and are within the scope of this disclosure.

Computing system 101 processes the display instructions to render a graphical user interface to the application, wherein the at least one data item is displayed according to the display properties and positioned in the graphical user interface based on the position information (204). In some implementations, the graphical user interface rendered by computing system 101 comprises a dashboard that presents the selected data items of the industrial automation environment for viewing by the user according to the specified display instructions. In at least one implementation, computing system 101 continuously updates the data items with dynamic performance data of the machine operations, which can be set as the default behavior or configured in the display instructions. In some implementations, the display instructions could include instructions to split a display into at least two sections, so that when processing the display instructions to render the graphical user interface to the application, computing system 101 would split the display of the graphical user interface into at least two sections. Various data items identified in the display instructions may then be positioned within the two or more sections according to the position information.

Advantageously, by processing the display instructions, computing system 101 renders a graphical user interface comprising the data items selected by the user arranged according to the position information and having display properties as defined in the display instructions. In this manner, the user is able to design and view a customized display of the selected data items, enabling the user to easily monitor important plant data and machine operations, resulting in increased productivity and an improved user experience. Some examples of a user interacting with a graphical display of a computing system that illustrate various possible implementations of the techniques disclosed herein will now be discussed with respect to FIGS. 3 through 17.

Figure 3:
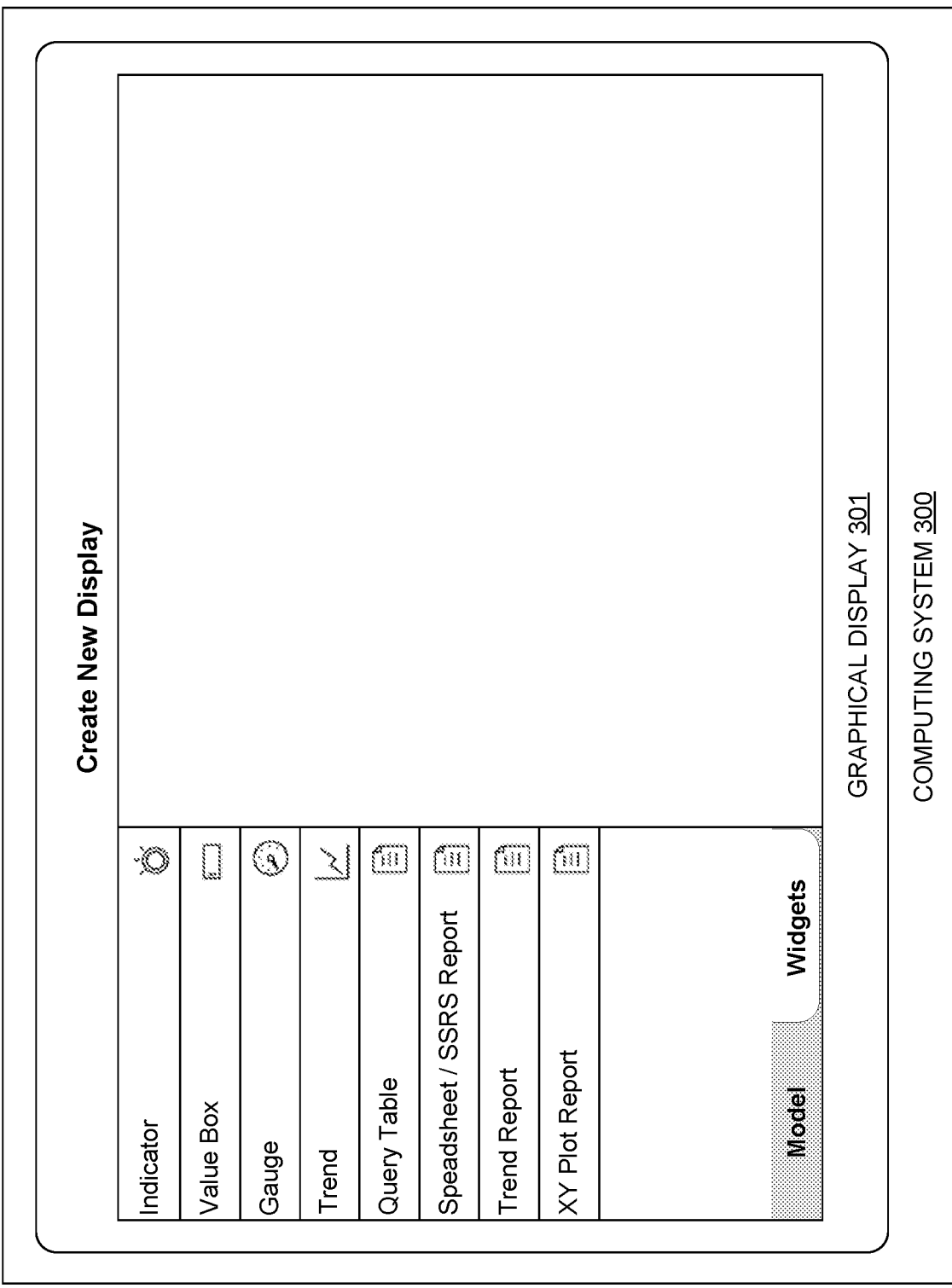
FIGS. 3-17 are block diagrams that illustrate various operational scenarios of computing systems in exemplary implementations.

FIG. 3 is a block diagram that illustrates an operational scenario involving computing system 300 in an exemplary implementation. In this example, graphical display 301 comprises a touch screen that displays a graphical user interface for the user to interact with and accepts input commands from the user via the user's touch on the surface of the touch screen. However, user input could be provided by a variety of different techniques in other examples, such as entering text commands with a keyboard, clicking a mouse pointer, speaking a voice command, or any other user input mechanism.

In FIG. 3, an exemplary interface that enables a user to compose and edit custom displays is shown on the touch screen of computing system 300, labeled "Create New Display". In some implementations, the user may typically access this display creation interface by selecting an option to create a new display.

In this example, the display composer interface includes two sections, divided into a menu on the left-hand side and a display composer on the right, although these windows could appear anywhere on the screen in other implementations. The menu in the left-hand pane provides various models and widgets that provide visualizations of operational data items, and the composer section in the right-hand pane provides a blank canvas that may be used to arrange the data items as the user desires them to be presented. As shown in the left-hand side, the user can select from either a list of widgets or a list of models, and these lists are selected by the tabs labeled "Model" and "Widgets" at the bottom of the left-hand side menu. In FIG. 3, the "Widgets" tab is selected, which provides the user with several different display items. In particular, the user can select from the "Widgets" list an indicator, value box, gauge, trend, query table, spreadsheet report, structured query language server reporting services (SSRS) report, trend report, and XY plot report. In some examples, additional types of reports, charts, and other data types may also be shown when the "Widgets" tab is selected and may be available for the user to select, but are not shown in FIG. 3 for clarity.

To begin designing a customized display or dashboard, the user could drag one of the data types listed in the "Widgets" menu on the left-hand side menu over to the right-hand side display canvas, causing a blank widget of the type selected to appear in the display composer. The user then typically assigns a particular data source to the blank widget, such as the pump speed of a particular machine, or any other value. The user can further customize the display by resizing the widget, defining custom display attributes and other properties, and positioning the widget in a desired area of the display screen, among other functionality. Examples of various blank widgets that have been selected by a user from the left-hand "Widgets" menu and dragged to the right-hand side design canvas are shown in FIGS. 4 and 5.

Figure 4:
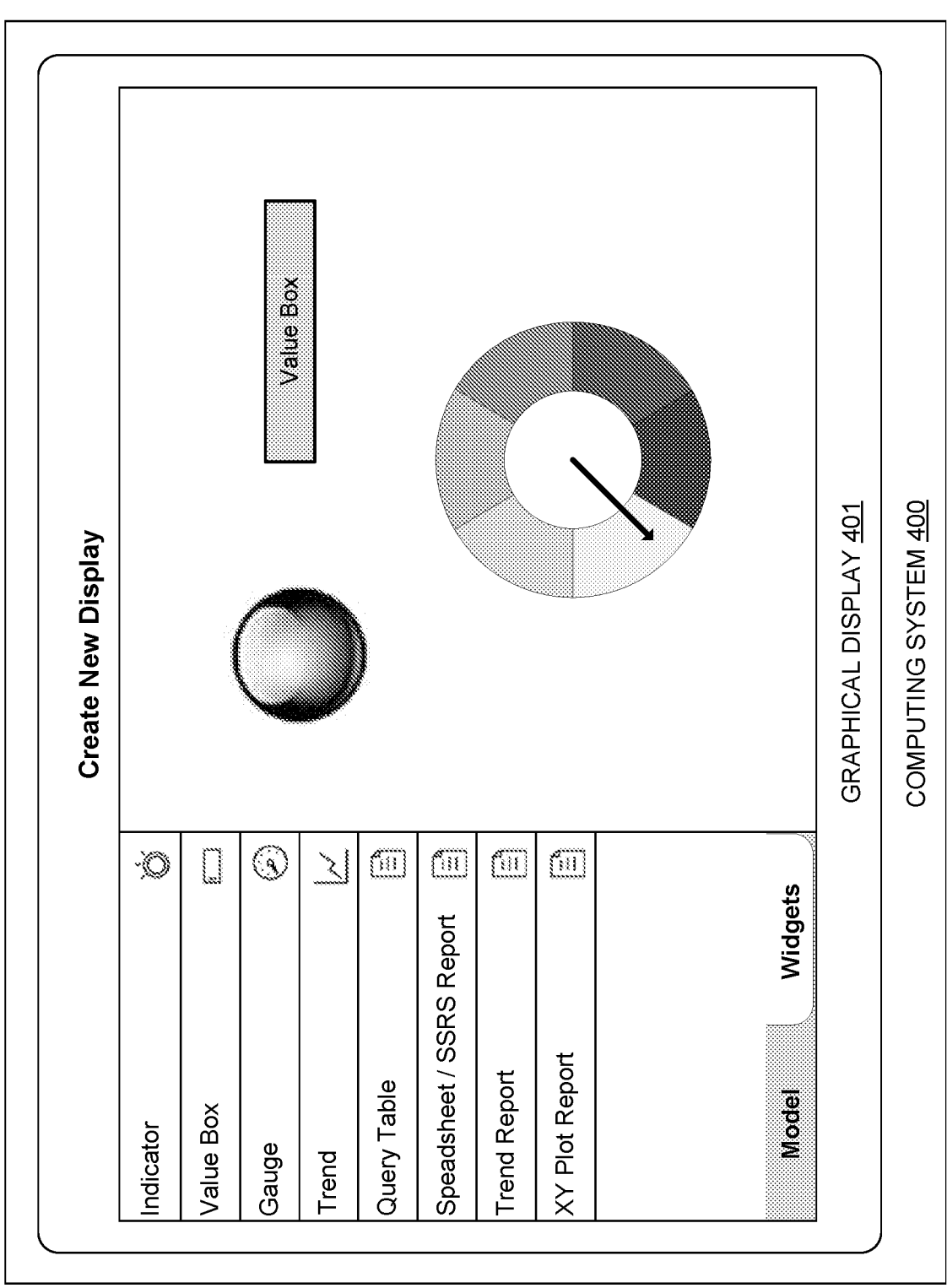

FIG. 4 provides an example of user selections from the "Widgets" tab, which create blank widgets in the display composer pane to which the user may assign values from a particular machine, model, or any other asset in an industrial automation environment. In FIG. 4, the user has dragged an "Indicator" from the left-hand "Widgets" tab to the right-hand design space, resulting in a blank indicator widget as shown in the top-left position of the display design canvas on computing system 400. To the right of the "Indicator" widget in the main display composer pane, the user has positioned a blank "Value Box" item from the left-hand "Widgets" menu. The value box appearing in graphical display 401 does not display a value because the user has yet to assign a value to the value box. As a result of the user dragging a "Gauge" item from the left-hand "Widgets"

menu to the right-hand design space, a blank gauge widget is shown at the bottom of the main display composer pane. Again, the user has not yet assigned a value to the gauge, so the gauge displays no data instead of an actual value.

Figure 5:
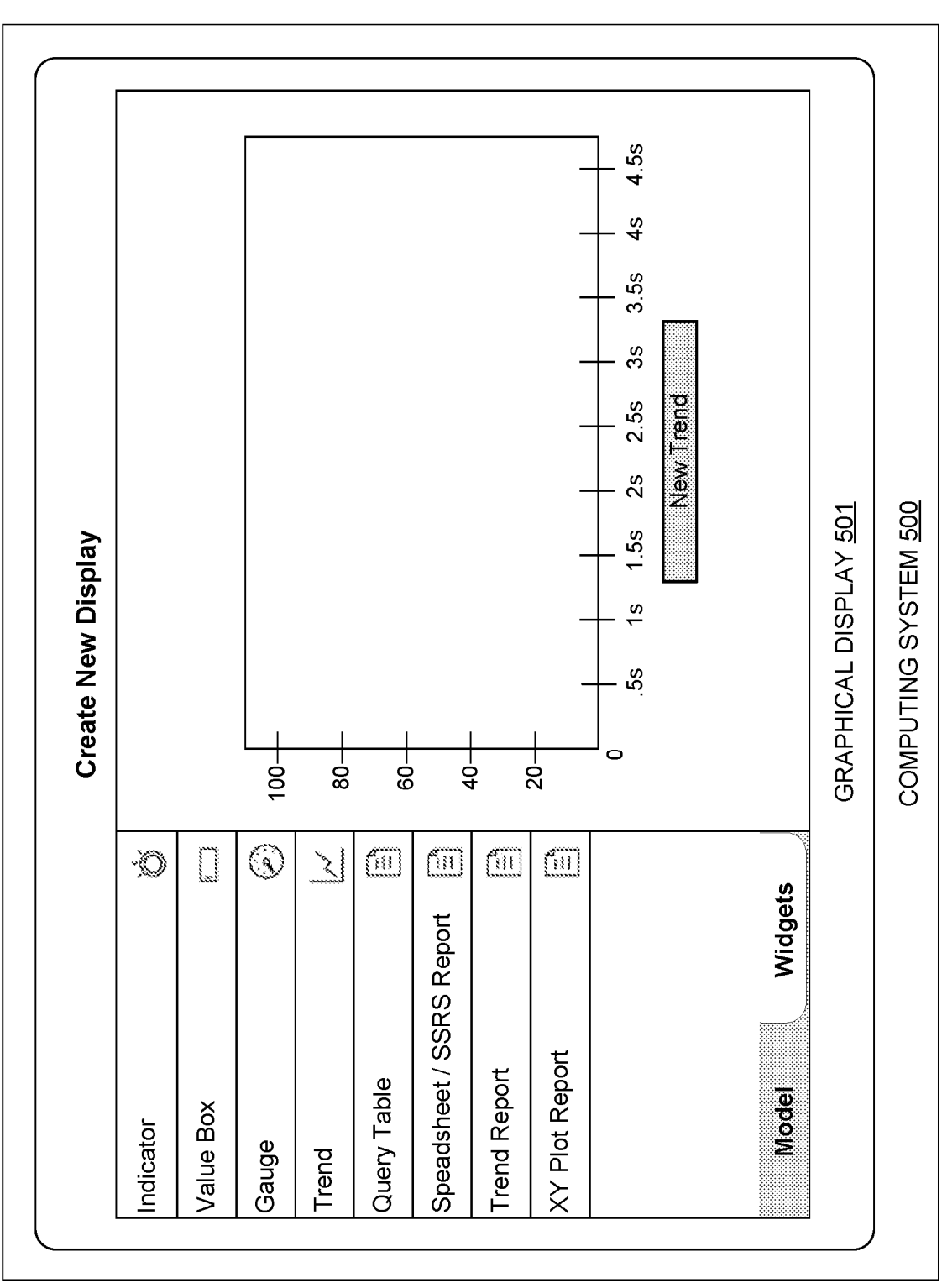

FIG. 5 illustrates graphical display 501 of computing system 500. In graphical display 501, the user has dragged a blank "Trend" diagram from the left-hand "Widgets" menu to the right-hand display design canvas. The trend diagram is blank because it has not yet been assigned a value by the user. The user could similarly add a query table, spreadsheet/ SSRS report, trend report, XY plot report, or any other widget listed among the options under the "Widgets" tab by dragging the desired widget to the right-hand side design pane and assigning an appropriate value. In this manner, the user is able to create fully customized displays and dashboards for viewing dynamic data associated with industrial automation operations in a style and layout as desired by the user.

Figure 6:
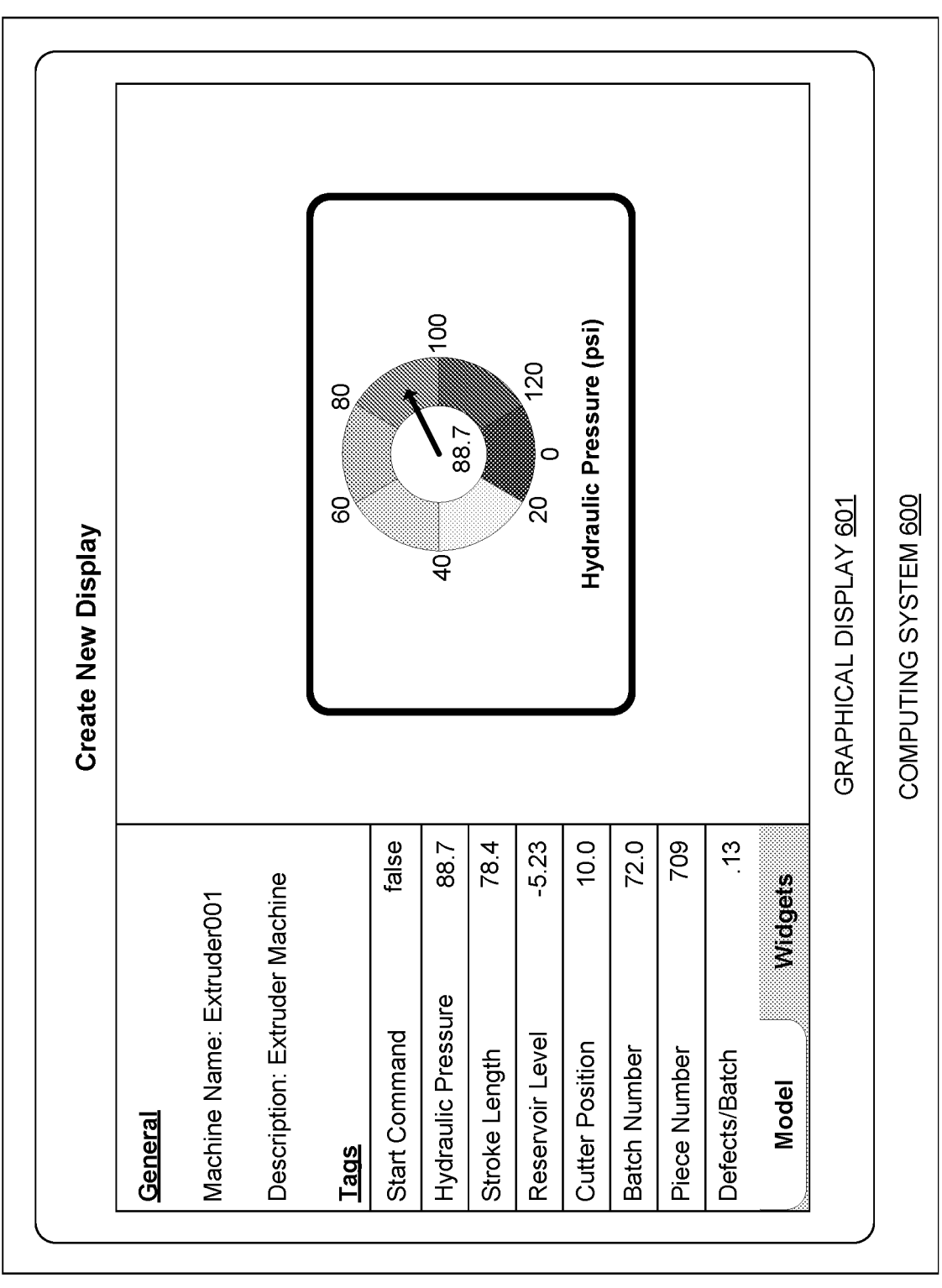

Referring now to FIG. 6, another operational scenario involving computing system 600 is illustrated in an exemplary implementation. In this example, the user has selected the tab labeled "Model" at the bottom of the left-hand side pane of graphical display 601, instead of the "Widgets" tab as shown in FIGS. 3, 4, and 5. The "Model" tab provides various information and data values for a particular machine or model. Under the "General" heading, various identifying information about the model is presented, such as the model name and description. The model name in this example is labeled "Extruder001", which indicates that the information listed below is associated with the "Extruder001" machine model. The user could select various other models for different machines and other assets in the industrial automation environment in other examples. Under the "Tags" heading, various data values are presented, such as whether or not the machine has received a start command, hydraulic pressure, stroke length, reservoir level, cutter position, batch number, piece number, the number of defects per batch, and the like. Of course, the number and type of data values that are shown will differ depending on the type of model or machine selected; the ones shown in FIG. 6 are merely exemplary.

In this example, the user has dragged a gauge for "Hydraulic Pressure" over to the right-hand side display design pane. In general, dragging a value from the left-hand side to the right-hand side will result in the value being displayed visually with a compatible widget. In this example, the "Hydraulic Pressure" value has a default widget type of a gauge, but the user is able to edit the properties of the widget to select a different display type from a list of compatible widgets, such as an indicator, value box, trend diagram, or any other type of visualization element.

Figure 7:
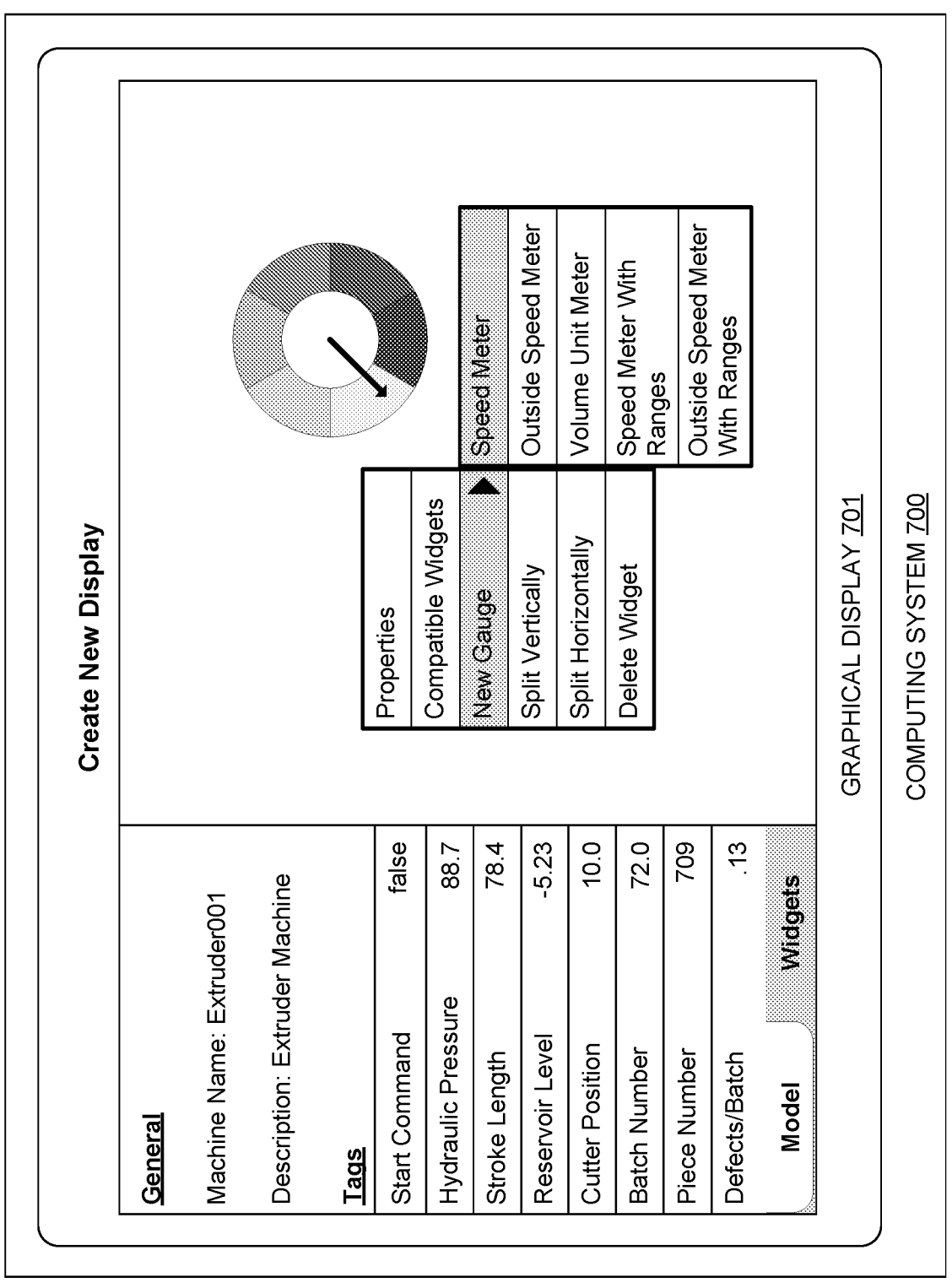

Referring now to FIG. 7, another operational scenario involving computing system 700 is illustrated in an exemplary implementation. In this example, the user has placed a gauge on the right-hand side composer section, and has accessed an options menu by selecting the gauge. As shown in graphical display 701 of FIG. 7, the options menu enables the user to select properties of the gauge, a list of compatible widgets other than the gauge that are capable of displaying the information, create a new gauge, split the design pane vertically, split the design pane horizontally, or delete the gauge widget. In this example, the user has selected the "New Gauge" option, which provides a sub-menu of available gauges, such as a speed meter, outside speed meter, volume unit meter, speed meter with ranges, and an outside speed meter with ranges. Of course, these gauge options are merely exemplary, and other types of gauges are possible and within the scope of this disclosure. However, instead of creating a new gauge from this menu, the user selects the "Properties" option from the drop-down menu to adjust the properties of the gauge that appears in FIG. 7, the result of which is shown in FIG. 8.

Figure 8:
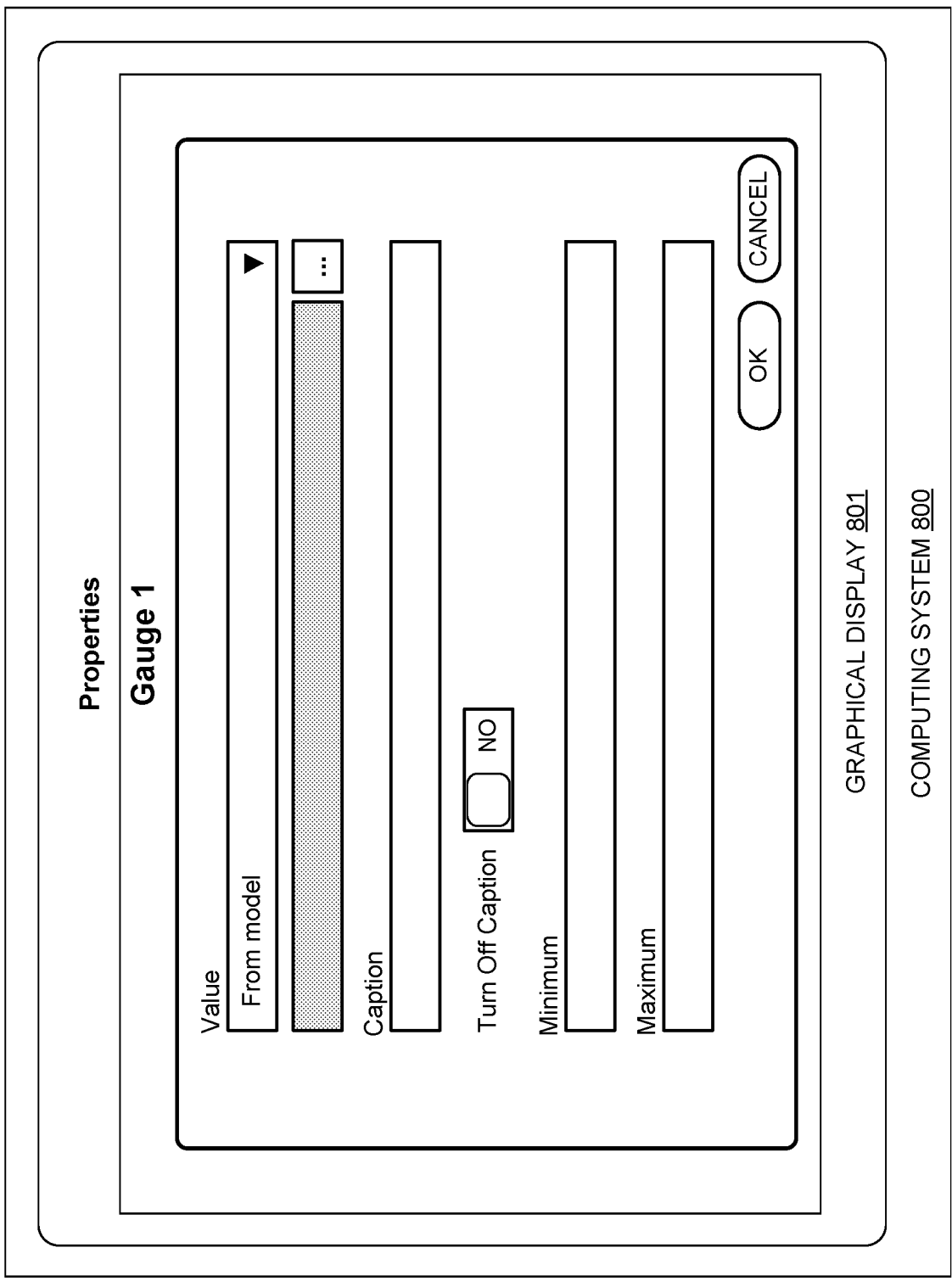

FIG. 8 illustrates another operational scenario involving computing system 800 in an exemplary implementation. In this example, the user has selected the "Properties" option for a gauge appearing in the display composer design space as discussed above with respect to FIG. 7. In the properties window shown on graphical display 801, the user is able to set various attributes of the gauge. For example, the value for the gauge is currently set to receive the data from the model, but the user is able to change the value to point to a different data source if desired. The user can also add a caption for the gauge, such as a description of what value the gauge is displaying, and may further select whether or not the caption should be displayed. Further, the user can set ranges for the gauge by entering values into the minimum and maximum value boxes. Of course, the number and type of options that are shown in the properties window will differ depending on the type of widget selected and the date item being represented by the widget, among other factors. The properties shown for the gauge in FIG. 8 are merely exemplary.

Figure 9:
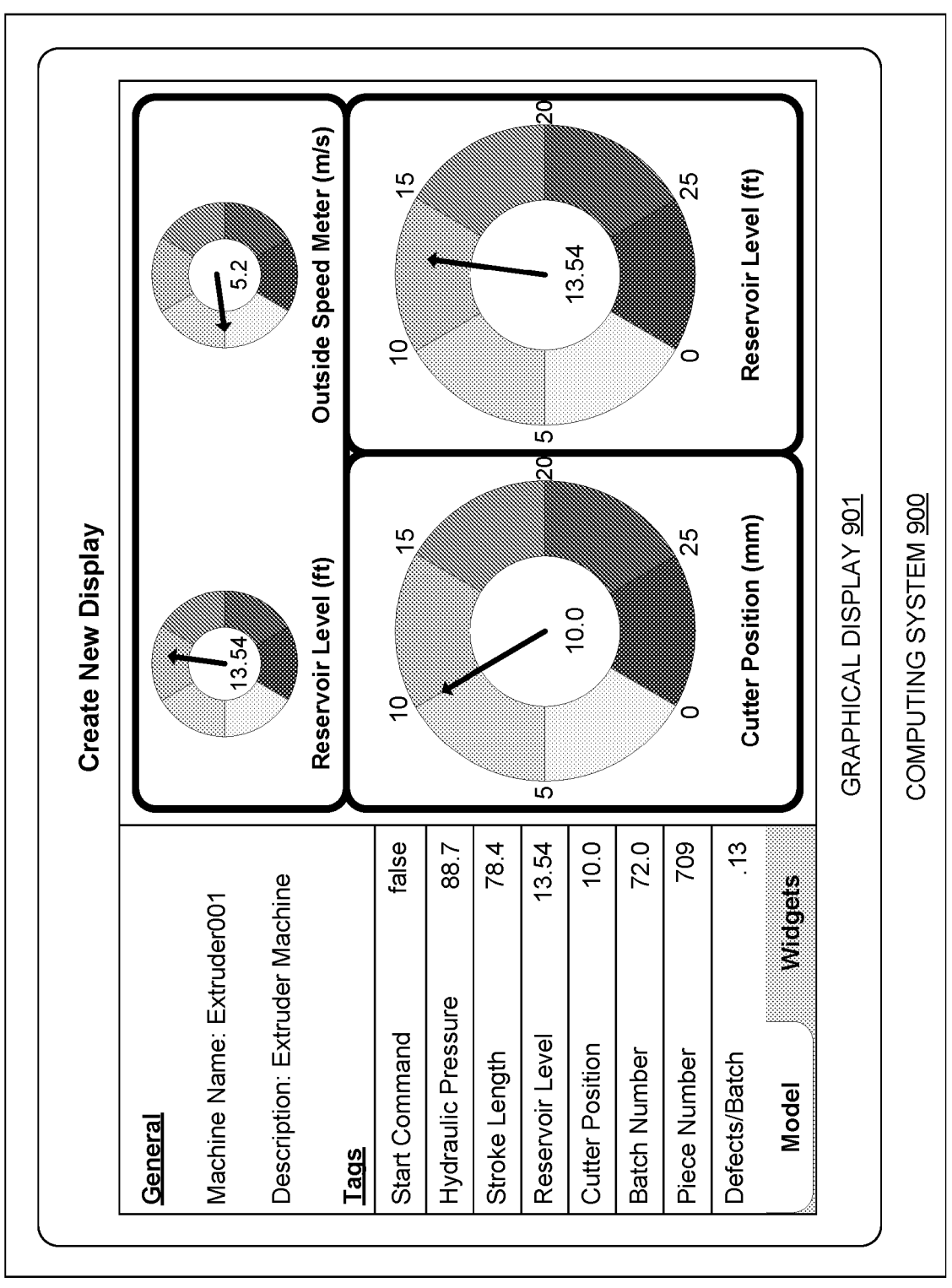

Referring now to FIG. 9, another operational scenario involving computing system 900 is illustrated in an exemplary implementation. In this example, the user has created a more advanced custom dashboard display. The user has split the right-hand side design pane both vertically and horizontally, creating a wide horizontal cell above two narrower vertical cells. The top cell contains two gauges, set to display the reservoir level and the outside speed. These gauges have also been resized to fit within the smaller horizontal cell at the top of the display. The lower left-hand cell displays a larger gauge that indicates the cutter position, while the lower right-hand cell displays the reservoir level. Note that the gauge showing the reservoir level in the lower right-hand cell provides the same information as the gauge showing the reservoir level in the topmost horizontal cell, but in a larger size with greater detail. By arranging the gauges within the various cell sections as shown on graphical display 901 of FIG. 9, the user has effectively created a customized dashboard for viewing information about the "Extruder001" model.

Figure 10:
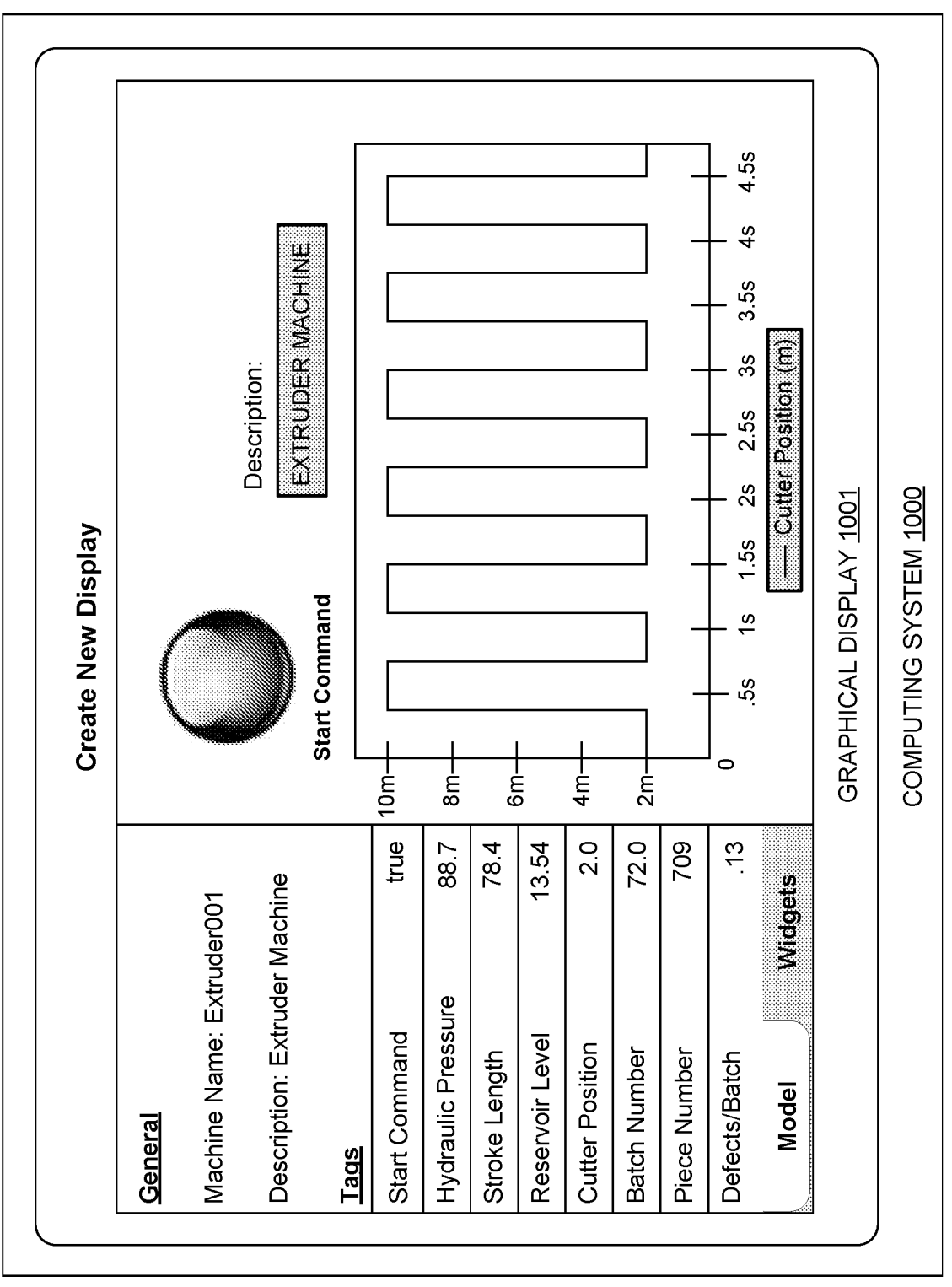

FIG. 10 illustrates an operational scenario involving computing system 1000 in an exemplary implementation. As shown on graphical display 1001 of FIG. 10, the user has selected a "Start Command" from the left-hand "Tags" menu and positioned the indictor for the start command in the top-left corner of the display composer section. The start command informs the user of whether or not the machine is running, and could include user-definable properties to change the color of the indicator depending on the running state, among other options. In addition to the "Start Command" indicator, the user has dragged a value box for the description of the model to the top-right corner of the main design pane, which displays "Extruder Machine". Beneath the "Start Command" indicator and the model description text box, the user has positioned a trend diagram for the "Cutter Position" value, which the user has selected from the left-hand "Tags" menu. The trend diagram of FIG. 10 indicates the cutter position over time.

Figure 11:
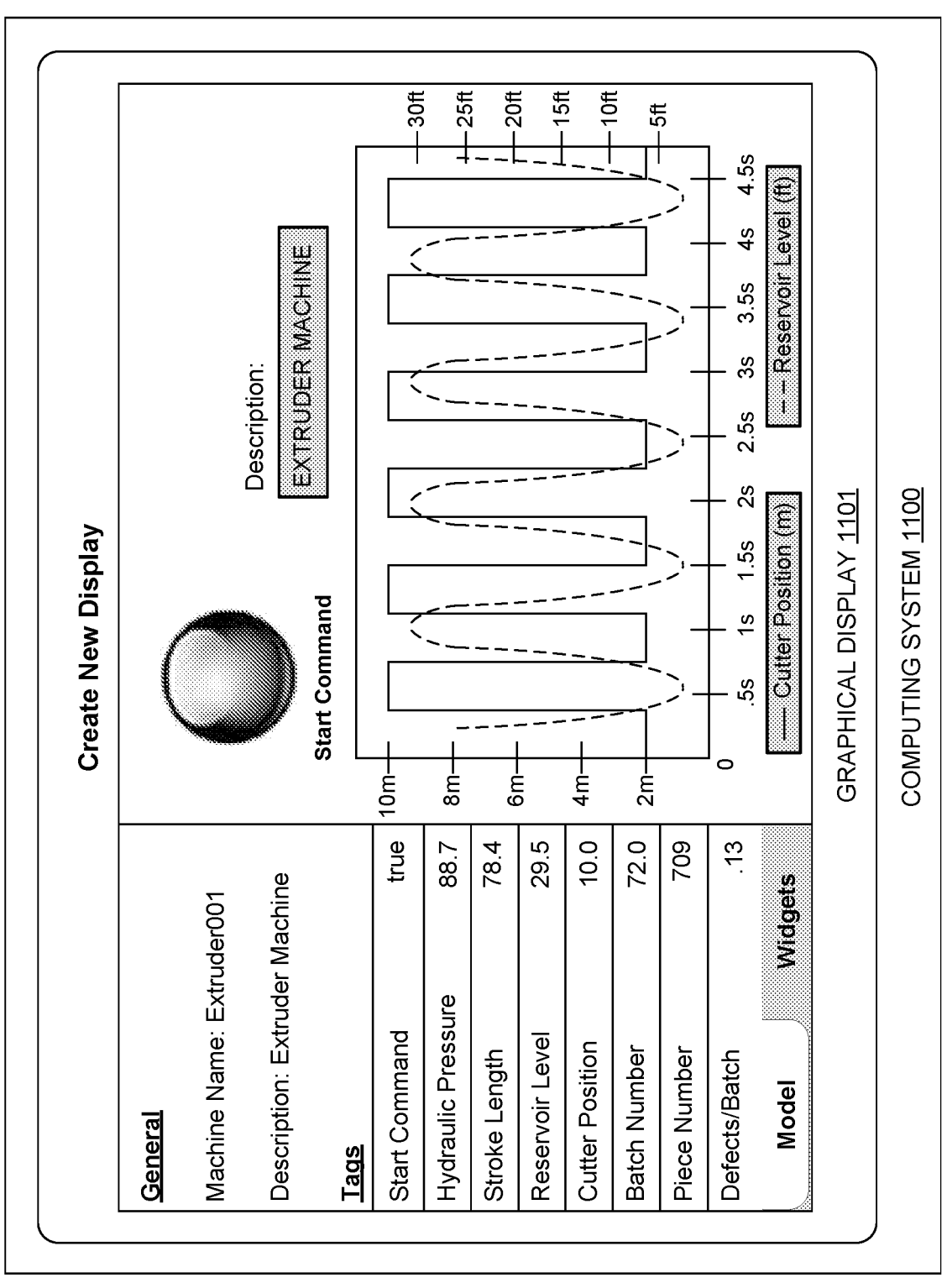

FIG. 11 illustrates an operational scenario involving computing system 1100 and graphical display 1101 in an exemplary implementation. In addition to the "Start Command"

indicator and the description of the model as shown in FIG. 10, FIG. 11 shows the same trend diagram for the cutter position as FIG. 10, except in this example, the user has also dragged the "Reservoir Level" value over to the trend diagram, causing the reservoir level value to be displayed graphically over time on the trend diagram as well. The "Reservoir Level" is represented by the dashed line appearing on the trend diagram. This combined trend diagram enables the user to view the two data items graphically on the same diagram simultaneously. The user could continue to add as many values to this trend diagram as desired, and the application would display all of the included values on the trend together.

Figure 12:
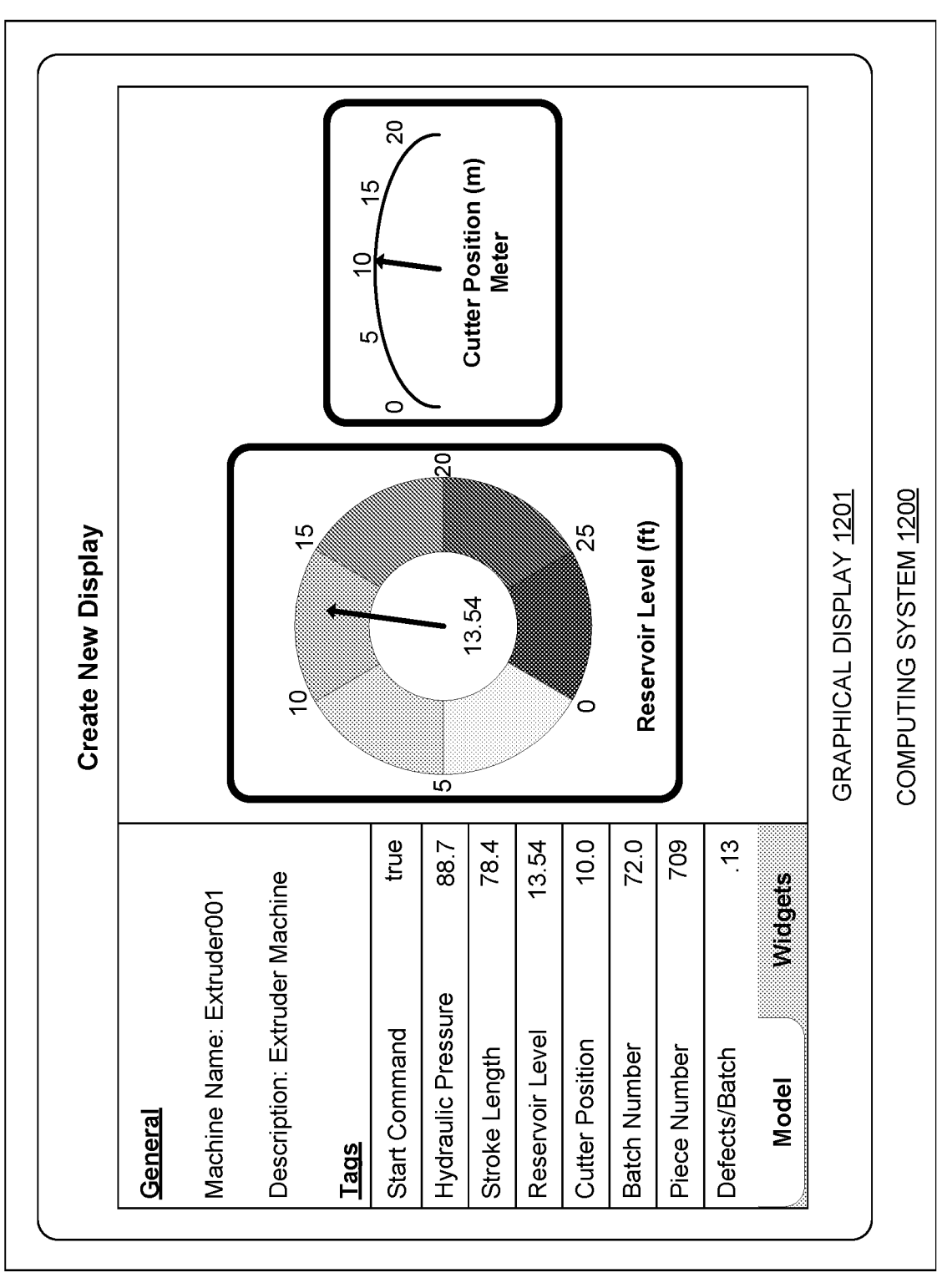

FIG. 12 illustrates an operational scenario involving computing system 1200 in an exemplary implementation. Graphical display 1201 of FIG. 12 shows a new display with two gauges, labeled "Reservoir Level" and "Cutter Position". The gauge for the "Reservoir Level" is a round gauge with values ranging from zero to twenty five feet. The gauge for the "Cutter Position" is a linear meter with values ranging from zero to twenty meters. Various other styles of gauges and meters are possible and within the scope of this disclosure.

Figure 13A:
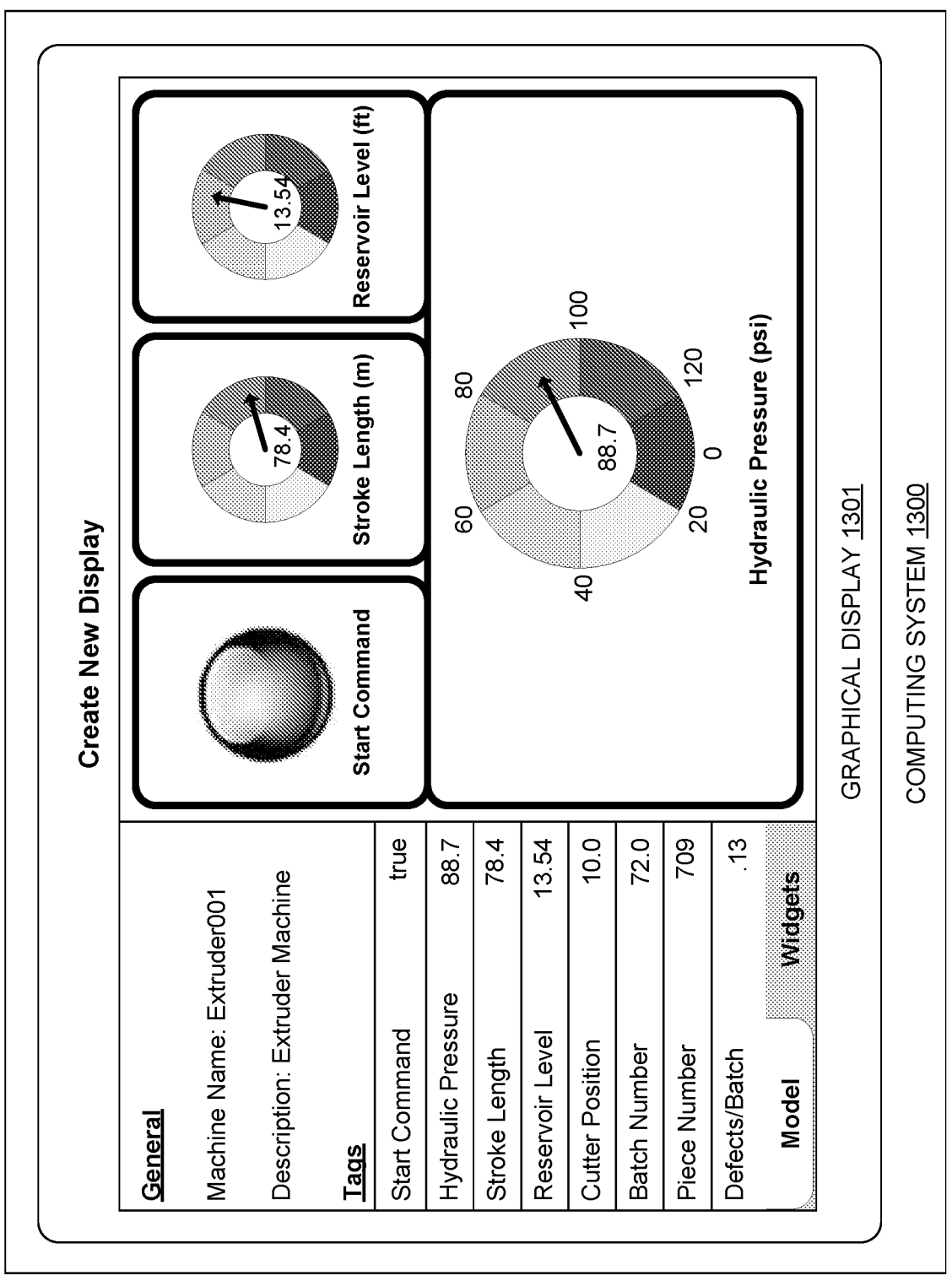

FIG. 13A illustrates an operational scenario involving computing system 1300 in an exemplary implementation. FIG. 13A provides another example where a user has split the right-hand design pane of graphical display 1301 into multiple smaller cells. In this example, the user has split the display into three cells along the top with a single cell beneath them. The left-most cell along the top row includes a "Start Command" widget, which indicates the operational status of the "Extruder001" machine on a factory floor. The middle cell in the top row of cells includes a gauge for "Stroke Length", and the cell on the right-hand side of the top row shows a gauge displaying the "Reservoir Level". In the bottom cell, the user has included a gauge to show "Hydraulic Pressure". While creating the custom display, the user can split the display into as many cells as the user desires, and can resize the cells to accommodate greater or fewer widgets in each cell, or to display a widget in a larger or smaller size. The effect of the user resizing the cells in this manner will now be demonstrated with respect to FIGS. 13B and 13C.

Figure 13B:
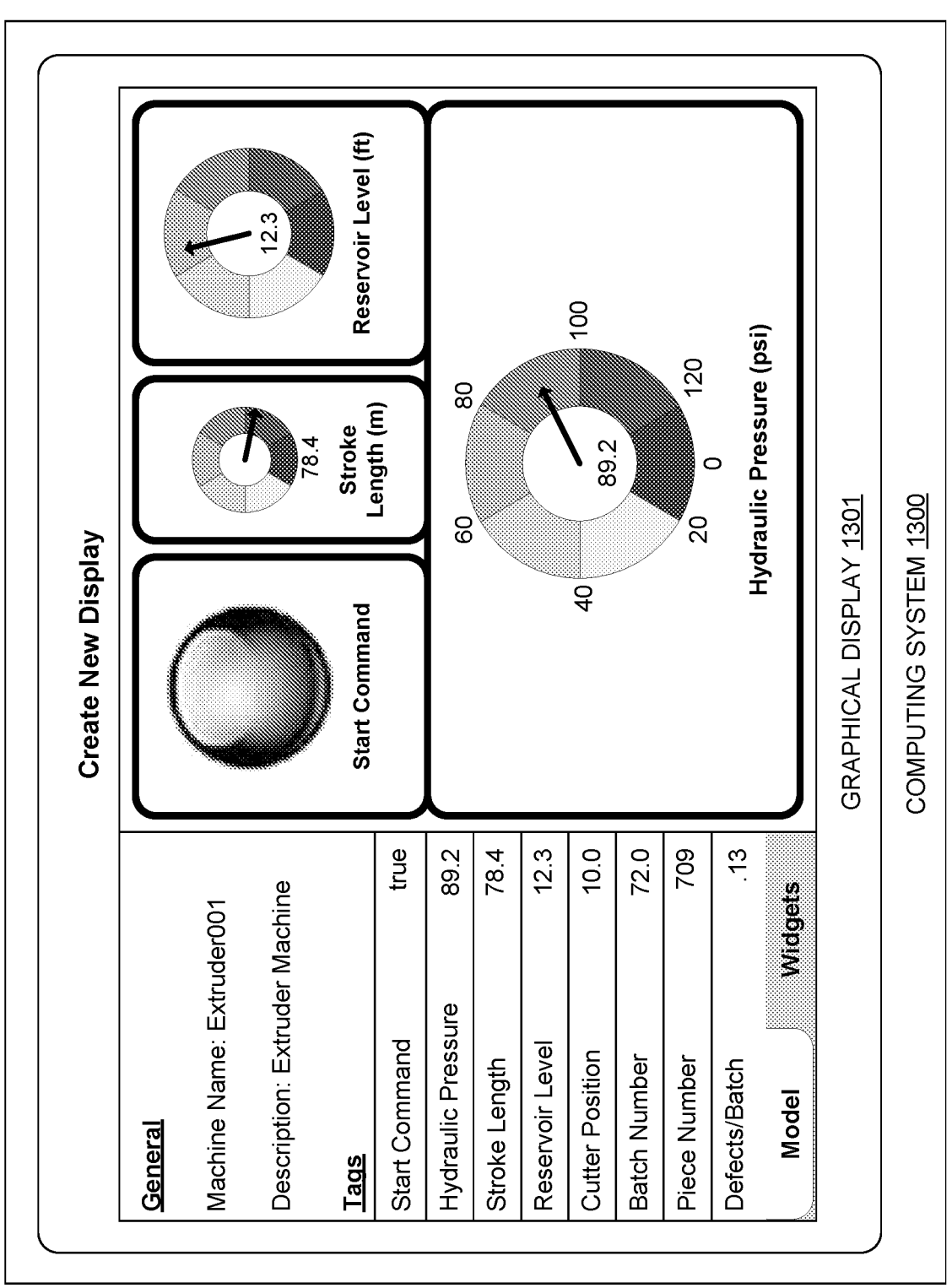

FIG. 13B illustrates an operational scenario involving computing system 1300 in an exemplary implementation that is similar to FIG. 13A, except that the user has resized the middle cell in the top row to be narrower. In this example, the result of narrowing the center cell in the top row is that the "Stroke Length" gauge contained therein has been automatically resized as well to fit the narrower cell. In addition, the "Reservoir Level" and "Hydraulic Pressure" gauges display different values on FIG. 13A and FIG. 13B, because the application continually receives updated values as they are constantly changing during machine operation, and these dynamic values can be displayed on the gauges in real-time (or near real-time depending on signal transmission delay).

Figure 13C:
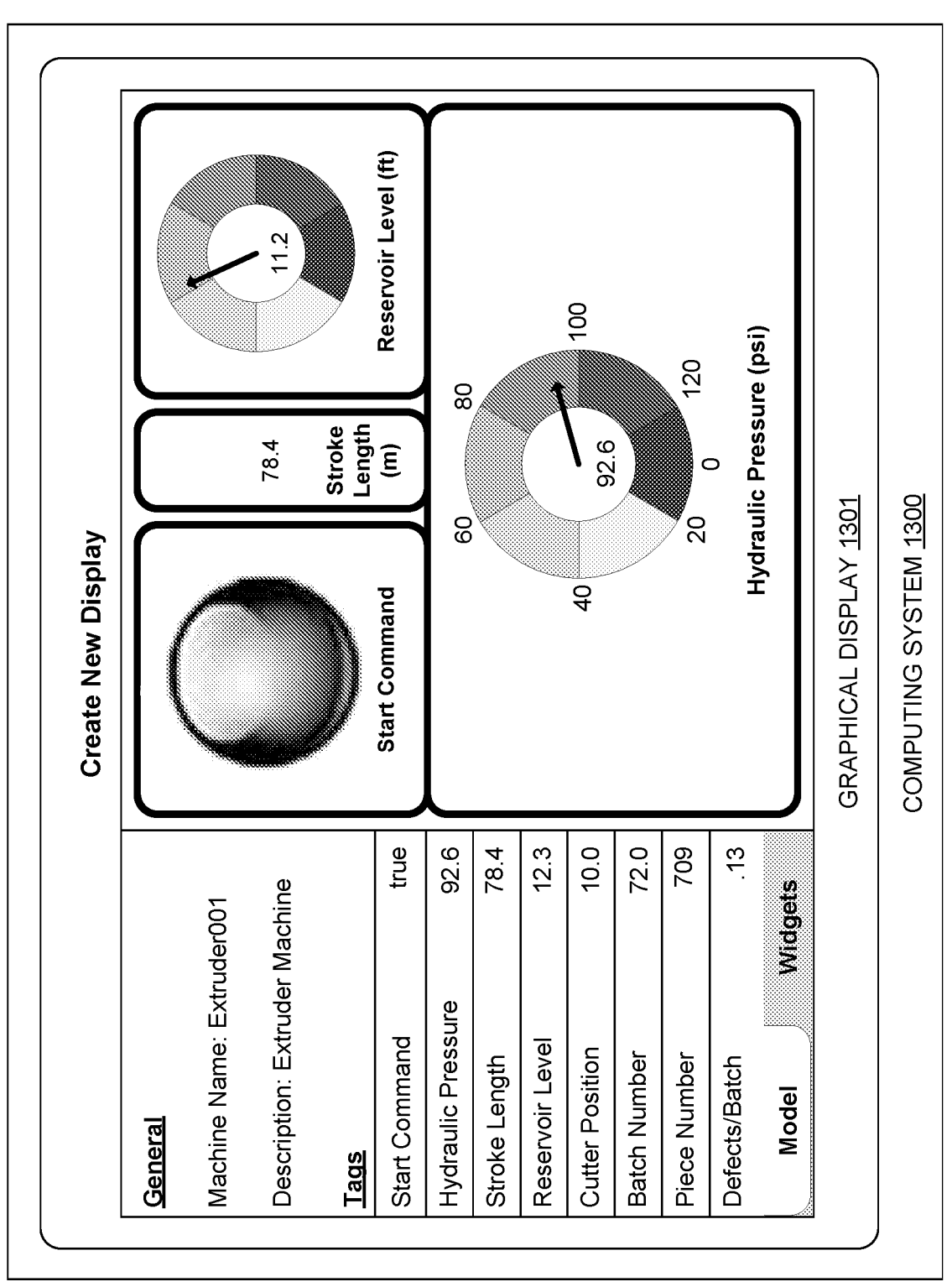

FIG. 13C illustrates an operational scenario involving computing system 1300 in an exemplary implementation that is similar to FIG. 13B, except that the user has again resized the middle cell in the top row to be even narrower than in FIG. 13B. The result of narrowing the center cell in the top row in this example is that there is now no longer enough room in the cell to display a graphical representation of a gauge. Instead, only the numerical value and a label or description (i.e., "Stroke Length") is shown in the center cell. Effectively, each widget graphic type has a minimum cell size threshold for displaying the image, and once the user reduces the size of the cell to below that threshold, the application no longer displays the image of the widget and instead just displays the data value. This resizing behavior enables the user to fit even more information on the custom display dashboard, providing the user with a great amount of control over how the information is presented. The user can then save the display design for later viewing, as will now be discussed with respect to FIG. 14.

Figure 14:
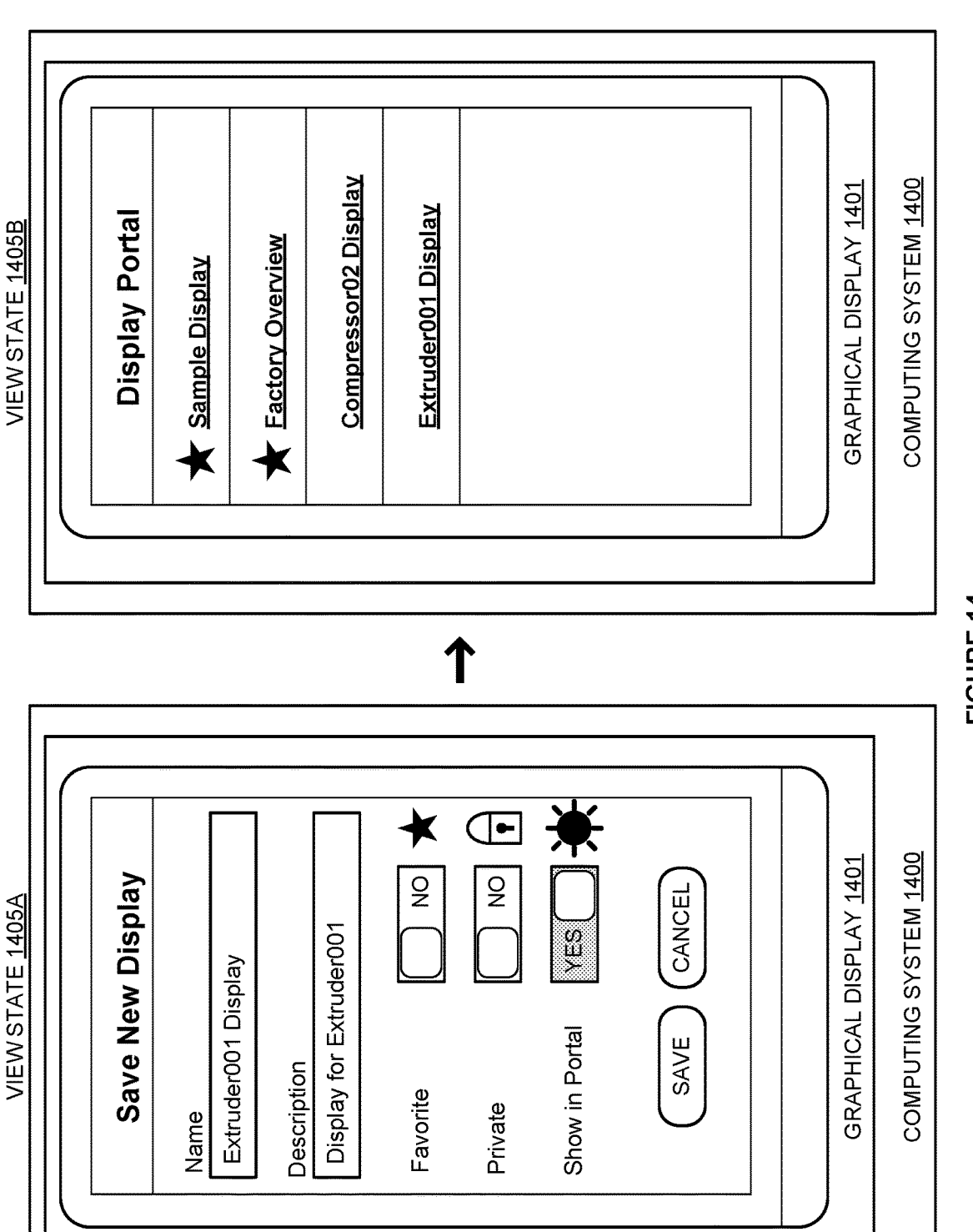

FIG. 14 illustrates an operational scenario involving computing system 1400 in an exemplary implementation. FIG. 14 shows two different display screens that may appear on graphical display 1401 of computing system 1400. The display on the left-hand side of FIG. 14, labeled "View State 1405A", shows a dialog box entitled "Save New Display", enabling a user to save a custom dashboard design for later viewing. The user has entered the name of the display as "Extruder001 Display". The user can also add a description of the display, which in this case the user has described as "Display for Extruder001". In this example, the user is presented with options to set the display as a favorite, mark the display as public or private, and select whether or not to show the display in the portal. If the user sets the display as a favorite, then the display will be prioritized in a list of favorite displays. The private option enables the user to mark the display as only for private use if selected, but in this case the display is set to public use that many authorized users can view. Once the user selects the desired options, the user can save the display, which could be done in this case by selecting the "Save" icon at the bottom left of the screen.

In this example, the option to show the display in the portal is selected, which results in the display appearing in a list of displays. Such a list of displays is shown in the "Display Portal" dialog box on the right-hand side of FIG. 14, labeled "View State 1405B". Accordingly, the newly-saved display entitled "Extruder001 Display" is now shown in the list of displays under the "Display Portal". The user can now select the "Extruder001 Display" from this list in order to view the current data presented in the screen layout defined by the user. Some examples of how the application presents a display for viewing by a user after the user has designed the customized look of the display will now be discussed with respect to FIGS. 15-17.

Figure 15:
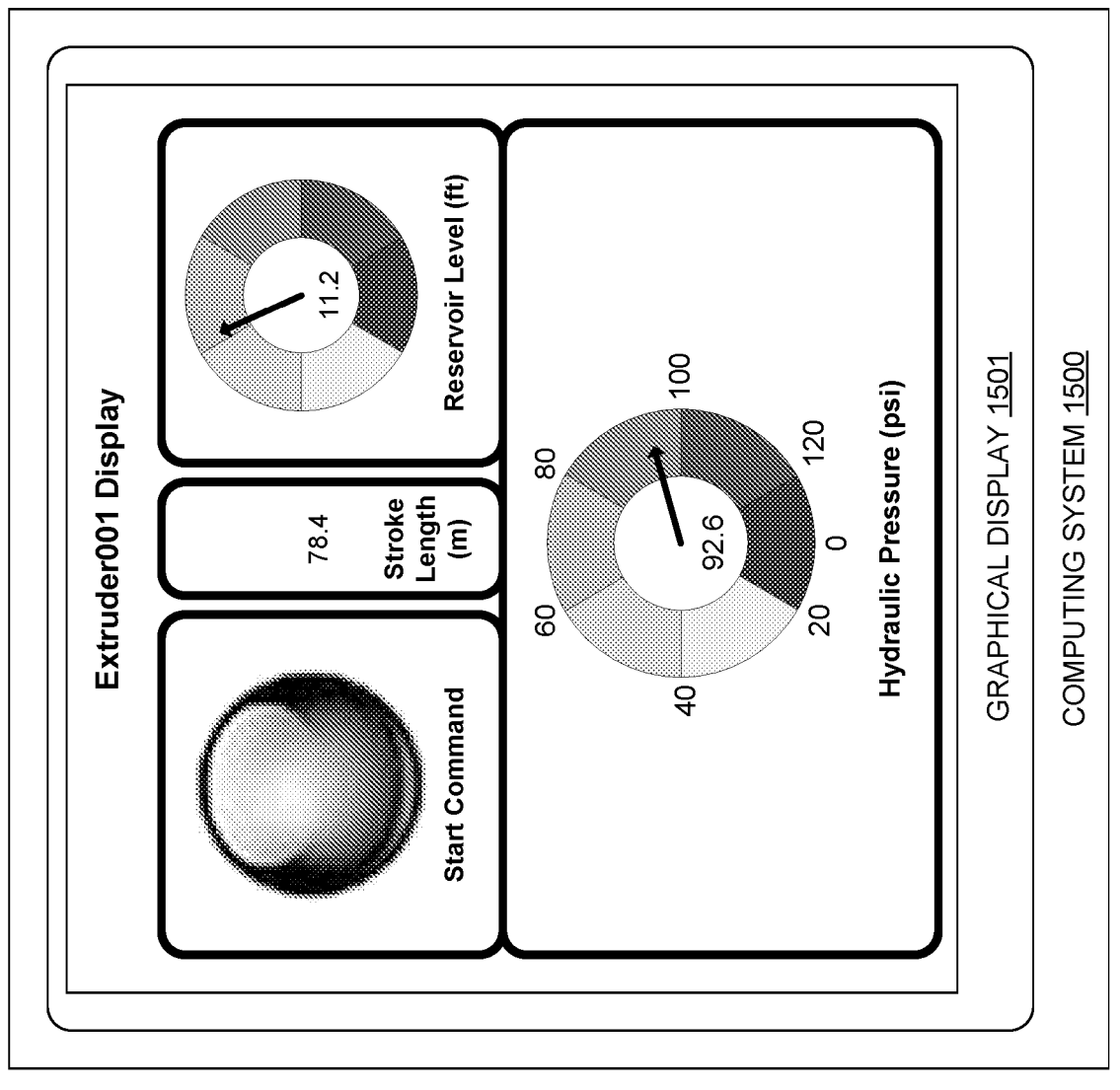

FIG. 15 illustrates an operational scenario involving computing system 1500 in an exemplary implementation. In FIG. 15, the user has previously created and saved a display entitled "Extruder001 Display" using the display composer functionality as discussed above with respect to FIGS. 3-14. In this example, the user has selected the "Extruder001 Display" for viewing, which is then shown in graphical display 1501 of FIG. 15. The "Extruder001 Display" created by the user has four cells, where the display is split into three cells along the top with a single cell beneath them. The left-most cell along the top row includes a "Start Command" widget, which indicates the operational status of the "Extruder001" machine on a factory floor. The middle cell in the top row of cells includes the value for "Stroke Length", and the cell on the right-hand side of the top row shows a gauge displaying the "Reservoir Level". In the bottom cell, the user has included a gauge to show "Hydraulic Pressure". When this display is viewed on a different sized display screen, the display can automatically resize to fit the different resolution, aspect ratio, or other display properties of the different screen. The effect of viewing a display on different sized screens will now be discussed with respect to FIGS. 16 and 17.

Figure 16:
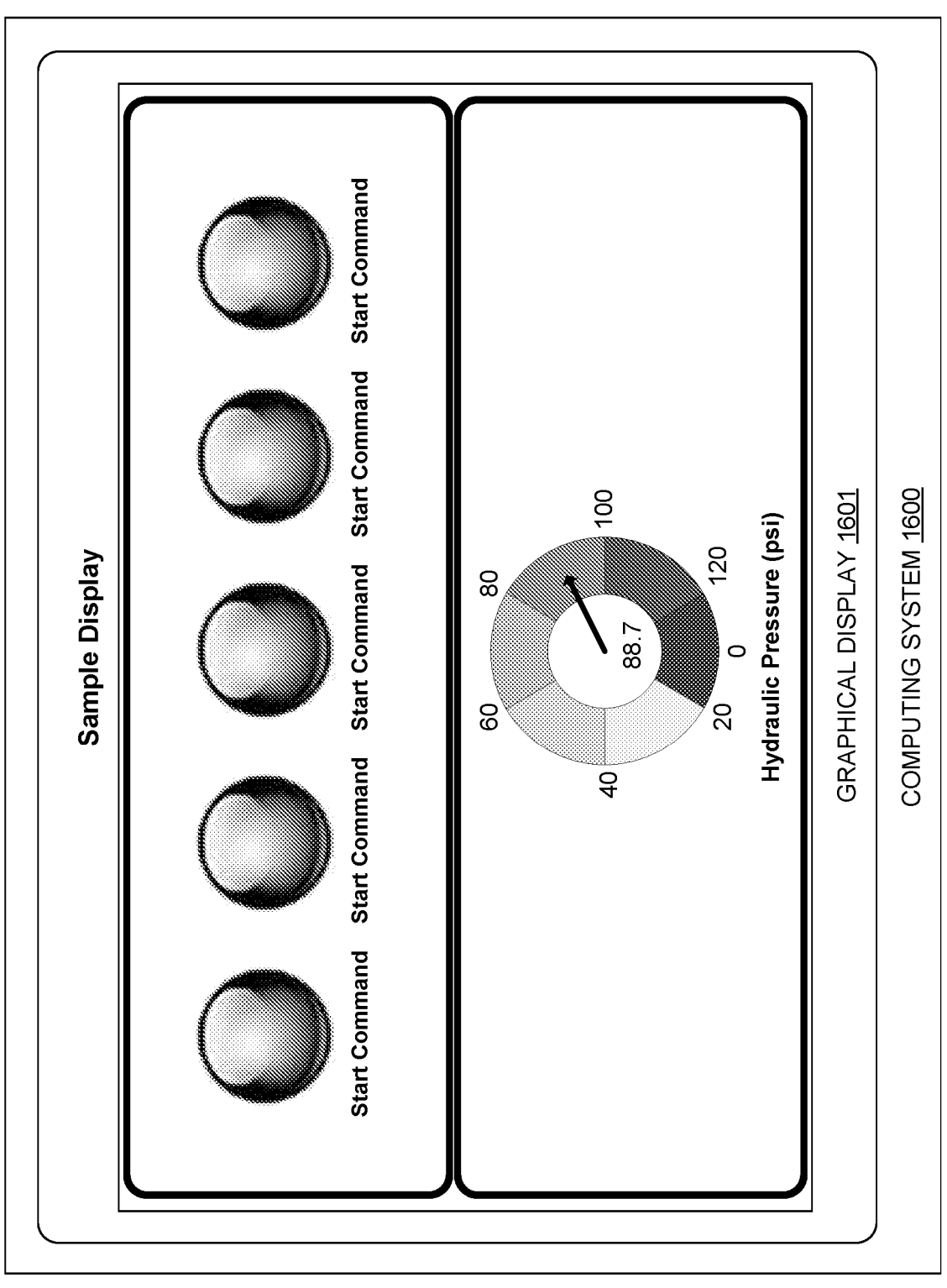

FIG. 16 illustrates an operational scenario involving computing system 1600 in an exemplary implementation. As shown on graphical display 1601, a display entitled "Sample Display" is presented for viewing by the user. The display has two cells, with the cell at the top having five "Start Command" widgets and the cell at the bottom containing a gauge that displays "Hydraulic Pressure". In this example, computing system 1600 includes a wide display screen that accommodates the five "Start Command" indicators to be displayed in a horizontal row. The effect of displaying this same "Sample Display" on a narrower screen size will now be discussed with respect to FIG. 17.

Figure 17:
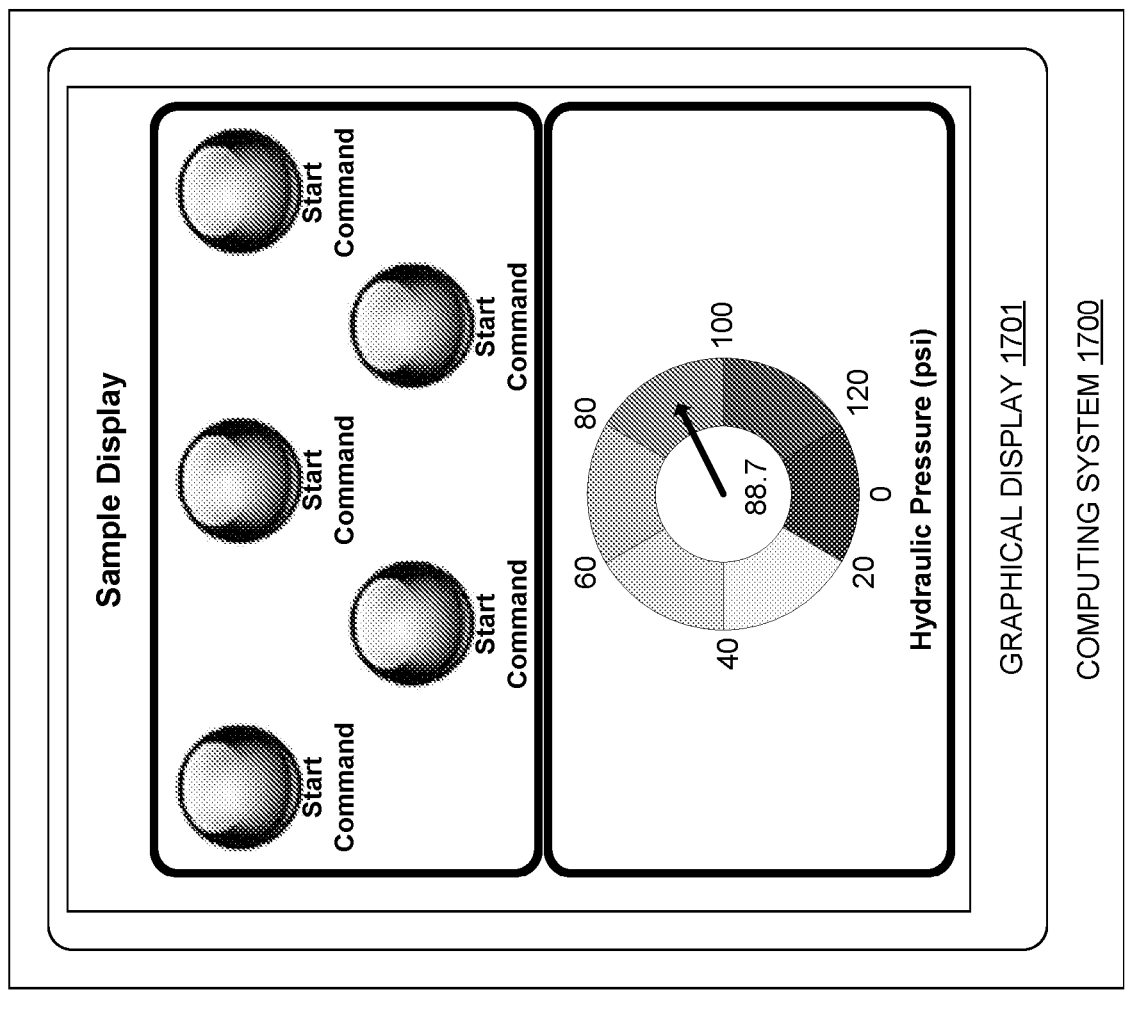

FIG. 17 illustrates an operational scenario involving computing system 1700 in an exemplary implementation. This example provides the same "Sample Display" as shown on computing system 1600 of FIG. 16, but in this example, computing system 1700 comprises a much narrower physical display screen. As shown on graphical display 1701, the narrower screen size has caused the cells of the display to be resized to fit the smaller screen space. The widgets within the cells are also resized to fit within the confines of the narrower cells. For example, in the top cell, the "Start Command" indicators have been automatically resized to a smaller size than shown in FIG. 16, and also rearranged to display in two rows instead of one, with three of the icons appearing in the top row and two of the indicators appearing in the bottom row. Advantageously, this automatic resizing behavior when the user is viewing a display provides greater adaptability to different display devices that may be utilized by the user.

Referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Application server 130 may be representative of any computing apparatus, system, or systems on which the techniques disclosed herein or variations thereof may be suitably implemented. Application server 130 comprises a processing system and communication transceiver. Application server 130 may also include other components such as a router, server, data storage system, and power supply. Application server 130 may reside in a single device or may be distributed across multiple devices. Application server 130 may be a discrete system or may be integrated within other systems, including other systems within communication system 100 or an automation control system. Some examples of application server 130 include desktop computers, server computers, cloud computing platforms, and virtual machines, as well as any other type of computing system, variation, or combination thereof. In some examples, application server 130 could comprise a programmable logic controller (PLC), programmable automation controller (PAC), network switch, router, switching system, packet gateway, authentication, authorization, and accounting (AAA) server, billing system, network gateway system, Internet access node, data server, database system, service node, firewall, or some other communication system, including combinations thereof. In some implementations, a PLC, PAC, and/or specific modules within the PLC rack could provide some or all of the functionality described herein for application server 130.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Turning now to FIG. 18, a block diagram that illustrates an industrial automation environment 1800 in an exemplary implementation is shown. Industrial automation environment 1800 provides an example of an industrial automation environment that may be utilized to implement the visualization processes disclosed herein, but other environments could also be used. Industrial automation environment 1800 includes computing system 1810, machine system 1820, industrial controller 1825, database system 1830, and application integration platform 1835. Machine system 1820 and controller 1825 are in communication over a communication link, controller 1825 and database system 1830 communicate over a communication link, database system 1830 and application integration platform 1835 communicate over a communication link, and application integration platform 1835 and computing system 1810 are in communication over a communication link. Note that there would typically be many more machine systems in most industrial automation environments, but the number of machine systems shown in FIG. 18 has been restricted for clarity.

Industrial automation environment 1800 comprises an automobile manufacturing factory, food processing plant, oil drilling operation, microprocessor fabrication facility, or some other type of industrial enterprise. Machine system 1820 could comprise a sensor, drive, pump, filter, drill, motor, robot, fabrication machinery, mill, printer, or any other industrial automation equipment, including their associated control systems. A control system comprises, for example, industrial controller 1825, which could include automation controllers, programmable logic controllers (PLCs), programmable automation controllers (PACs), or any other controllers used in automation control. Additionally, machine system 1820 could comprise other industrial equipment, such as a brew kettle in a brewery, a reserve of coal or other resources, or any other element that may reside in an industrial automation environment 1800.

Machine system 1820 continually produces operational data over time. The operational data indicates the current status of machine system 1820, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 1820 and/or controller 1825 is capable of transferring the operational data over a communication link to database system 1830, application integration platform 1835, and computing system 1810, typically via a communication network. Database system 1830 could comprise a disk, tape, integrated circuit, server, or some other memory device. Database system 1830 may reside in a single device or may be distributed among multiple memory devices.

Application integration platform 1835 comprises a processing system and a communication transceiver. Application integration platform 1835 may also include other components such as a router, server, data storage system, and power supply. Application integration platform 1835 provides an example of application server 130, although server 130 could use alterative configurations. Application integration platform 1835 may reside in a single device or may be distributed across multiple devices. Application integration platform 1835 may be a discrete system or may be integrated within other systems—including other systems within industrial automation environment 1800. In some examples, application integration platform 1835 could comprise a FactoryTalk® VantagePoint server system provided by Rockwell Automation, Inc.

The communication links over which data is exchanged between machine system 1820, industrial controller 1825, database system 1830, application integration platform 1835, and communication interface 1808 of computing system 1810 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 1810 may be representative of any computing apparatus, system, or systems on which the visualization processes disclosed herein or variations thereof may be suitably implemented. Computing system 1810 provides an example of a computing system that could be used as a either a server or a client device in some implementations, although such devices could have alternative configurations. Examples of computing system 1810 include mobile computing devices, such as cell phones, tablet computers, laptop computers, notebook computers, and gaming devices, as well as any other type of mobile computing devices and any combination or variation thereof. Examples of computing system 1810 also include desktop computers, server computers, and virtual machines, as well as any other type of computing system, variation, or combination thereof. In some implementations, computing system 1810 could comprise a mobile device capable of operating in a server-like fashion which, among other uses, could be utilized in a wireless mesh network.

Computing system 1810 includes processing system 1801, storage system 1803, software 1805, communication interface 1808, and user interface 1809. Processing system 1801 is operatively coupled with storage system 1803, communication interface 1808, and user interface 1809. Processing system 1801 loads and executes software 1805 from storage system 1803. Software 1805 includes application 1806 and operating system 1807. Application 1806 may include visualization process 200 in some examples. When executed by computing system 1810 in general, and processing system 1801 in particular, software 1805 directs computing system 1810 to operate as described herein for visualization process 200 or variations thereof. In this example, user interface 1809 includes display system 1811, which itself may be part of a touch screen that also accepts user inputs via touches on its surface. Computing system 1810 may optionally include additional devices, features, or functionality not discussed here for purposes of brevity.

Referring now to FIG. 19, a block diagram that illustrates computing system 1900 in an exemplary implementation is shown. Computing system 1900 provides an example of computing system 101, or any computing system that may be used to execute visualization process 200 or variations thereof, although such systems could use alternative configurations. Computing system 1900 includes processing system 1901, storage system 1903, software 1905, communication interface 1907, and user interface 1909. User interface 1909 comprises display system 1908. Software 1905 includes application 1906 which itself includes visualization process 200. Visualization process 200 may optionally be implemented separately from application 1906.

Computing system 1900 may be representative of any computing apparatus, system, or systems on which application 1906 and visualization process 200 or variations thereof may be suitably implemented. Examples of computing system 1900 include mobile computing devices, such as cell phones, tablet computers, laptop computers, notebook computers, and gaming devices, as well as any other type of mobile computing devices and any combination or variation thereof. Note that the features and functionality of computing system 1900 may apply as well to desktop computers, server computers, and virtual machines, as well as any other type of computing system, variation, or combination thereof.

Computing system 1900 includes processing system 1901, storage system 1903, software 1905, communication interface 1907, and user interface 1909. Processing system 1901 is operatively coupled with storage system 1903, communication interface 1907, and user interface 1909. Processing system 1901 loads and executes software 1905 from storage system 1903. When executed by computing system 1900 in general, and processing system 1901 in particular, software 1905 directs computing system 1900 to operate as described herein for visualization process 200 or variations thereof. Computing system 1900 may optionally include additional devices, features, or functionality not discussed herein for purposes of brevity.

Referring still to FIG. 19, processing system 1901 may comprise a microprocessor and other circuitry that retrieves and executes software 1905 from storage system 1903. Processing system 1901 may be implemented within a single processing device but may also be distributed across multiple processing devices or sub-systems that cooperate in executing program instructions. Examples of processing system 1901 include general purpose central processing units, application specific processors, and logic devices, as well as any other type of processing device, combinations, or variations thereof.

Storage system 1903 may comprise any computer readable media or storage media readable by processing system 1901 and capable of storing software 1905. Storage system 1903 may include volatile and nonvolatile, removable and non-removable media implemented in any method or technology for storage of information, such as computer readable instructions, data structures, program modules, or other data. Storage system 1903 may be implemented as a single storage device but may also be implemented across multiple storage devices or sub-systems co-located or distributed relative to each other. Storage system 1903 may comprise additional elements, such as a controller, capable of communicating with processing system 1901. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 1909, processing system 1901 loads and executes portions of software 1905, such as visualization process 200, to render a graphical user interface for application 1906 for display by display system 1908 of user interface 1909. Software 1905 may be implemented in program instructions and among other functions may, when executed by computing system 1900 in general or processing system 1901 in particular, direct computing system 1900 or processing system 1901 to present a plurality of data items associated with machine operations in an industrial automation environment, and receive a user selection of at least one data item of the plurality of data items. In addition, software 1905 directs computing system 1900 or processing system 1901 to receive display instructions comprising display properties of the at least one data item and position information that identifies where to display the at least one data item. Further, software 1905 directs computing system 1900 or processing system 1901 to process the display instructions to render a graphical user interface to the application, wherein the at least one data item is displayed according to the display properties and positioned in the graphical user interface based on the position information.

Software 1905 may include additional processes, programs, or components, such as operating system software or other application software. Examples of operating systems include Windows®, iOS®, and Android®, as well as any other suitable operating system. Software 1905 may also comprise firmware or some other form of machine-readable processing instructions executable by processing system 1901.

In general, software 1905 may, when loaded into processing system 1901 and executed, transform computing system 1900 overall from a general-purpose computing system into a special-purpose computing system customized to facilitate visualization of an application associated with an industrial automation environment as described herein for each implementation. For example, encoding software 1905 on storage system 1903 may transform the physical structure of storage system 1903. The specific transformation of the physical structure may depend on various factors in different implementations of this description. Examples of such factors may include, but are not limited to the technology used to implement the storage media of storage system 1903 and whether the computer-storage media are characterized as primary or secondary storage.

In some examples, if the computer-storage media are implemented as semiconductor-based memory, software 1905 may transform the physical state of the semiconductor memory when the program is encoded therein. For example, software 1905 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 1900 is generally intended to represent a computing system with which software 1905 is deployed and executed in order to implement application 1906 and/or visualization process 200 (and variations thereof). However, computing system 1900 may also represent any computing system on which software 1905 may be staged and from where software 1905 may be distributed, transported, downloaded, or otherwise provided to yet another computing system for deployment and execution, or yet additional distribution. For example, computing system 1900 could be configured to deploy software 1905 over the internet to one or more client computing systems for execution thereon, such as in a cloud-based deployment scenario.

Communication interface 1907 may include communication connections and devices that allow for communication between computing system 1900 and other computing systems (not shown) or services, over a communication network 1911 or collection of networks. In some implementations, communication interface 1907 receives dynamic data 1921 over communication network 1911. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 1909 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 1909. In this example, user interface 1909 includes display system 1908, which itself may be part of a touch screen that also accepts user inputs via touches on its surface. The aforementioned user input devices are well known in the art and need not be discussed at length here. User interface 1909 may also include associated user interface software executable by processing system 1901 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate visualization of an application associated with an industrial automation environment, the method comprising:

presenting, in a graphical user interface (GUI), a menu displaying a plurality of data items comprising real-time operational values corresponding to operations of a machine in the industrial automation environment;

receiving a user selection comprising a drag-and-drop of a first data item of the plurality of data items from the menu to a dashboard of the GUI, wherein the first data item comprises a first data item type of a plurality of data item types;

in response to the drag-and-drop of the first data item, automatically generating a display element for the first data item, wherein:

the display element comprises a plurality of display properties, the plurality of display properties comprises a display type property having an automatically populated value of a first display type value selected from a plurality of display type values, wherein the first display type value corresponds to a graphical representation of a gauge visually depicting a first real-time operational data value of the machine, and the automatically populated value is based on a determination that the first data item type has a default display type value corresponding to the graphical representation of the gauge;

receiving display instructions comprising:

an instruction to resize the display element to a smaller size, and position information that identifies where to display the display element;

determining that the smaller size is below a minimum threshold associated with the graphical representation of the gauge;

modifying, in response to the determination, the value of the display type property from the first display type value to a second display type value associated with display of a numerical representation of the first real-time operational data value of the machine; and rendering, in the GUI, the display element according to the plurality of display properties, wherein the display element is positioned in the GUI based on the position information.

2. The method of claim 1, further comprising:

continuously updating the display element with real-time operational data values.

3. The method of claim 1, wherein the plurality of display properties further comprises one or more of:

a description property;

a data item source property;

a caption property;

a data range property;

a unit property;

a data format property;

a degree of accuracy property;

a display size property; and an orientation property.

4. The method of claim 1, further comprising:

presenting a drop-down menu in the graphical user interface comprising a selectable list of display type values compatible with the first data item type.

5. The method of claim 4, further comprising:

receiving a second user selection of a third display type value from the selectable list of display type values;

in response to the second user selection, updating the value of the display type property to the third display type value; and updating the display element using the third display type value for the display type property.

6. The method of claim 1, further comprising:

receiving a second user selection of a second display element;

providing, via the graphical user interface, input options for the display properties for the second display element;

in response to receiving a selection of a second data item as a value for a data item source property of the second display element, generating the second display element for the second data item; and updating the graphical user interface to display the second display element in addition to the display element.

7. The method of claim 1, further comprising:

saving the display instructions to render the graphical user interface as a user customized dashboard.

8. The method of claim 7, wherein the saving the display instructions is performed on a first user device, the method further comprising:

receiving a selection of the user customized dashboard on a second user device different from the first user device;

identifying a size of a display of the second user device; and automatically resizing the display element, modifying the position information of the display element, or both to adapt to the size of the display.

9. The method of claim 1, further comprising:

receiving a user selection of a second data item of the plurality of data items, wherein the user selection is a drag-and-drop action, and the second data item is dropped onto the display element; and updating the display element to display first data item values for the first data item and second data item values for the second data item.

10. A system to facilitate visualization of an application associated with an industrial automation environment, the system comprising:

one or more processors; and one or more memories operably coupled to the one or more processors and having stored thereon software instructions that, upon execution by the one or more processors, cause the one or more processors to:

present, in a graphical user interface (GUI), a menu displaying a plurality of data items comprising real-time operational values corresponding to operations of a machine in the industrial automation environment;

receive a user selection comprising a drag-and-drop of a first data item of the plurality of data items from the menu to a dashboard of the GUI, wherein the first data item comprises a first data item type of a plurality of data item types;

in response to the drag-and-drop of the first data item, automatically generate a display element for the first data item, wherein:

the display element comprises a plurality of display properties, the plurality of display properties comprises a display type property having an automatically populated value of a first display type value selected from a plurality of display type values, wherein the first display type value corresponds to a graphical representation of a gauge visually depicting a first real-time operational data value of the machine, and the automatically populated value is based on a determination that the first data item type has a default display type value corresponding to the graphical representation of the gauge;

receive display instructions comprising:

an instruction to resize the display element to a smaller size, and position information that identifies where to display the display element;

determine that the smaller size is below a minimum threshold associated with the graphical representation of the gauge;

modify, in response to the determination, the value of the display type property from the first display type value to a second display type value associated with display of a numerical representation of the first real-time operational data value of the machine; and render, in the GUI, the display element according to the plurality of display properties wherein the display element is positioned in the GUI based on the position information.

11. The system of claim 10, wherein the instructions comprise further instructions that, upon execution by the one or more processors, cause the one or more processors to:

continuously update the display element with real-time operational data values.

12. The system of claim 10, wherein the instructions comprise further instructions that, upon execution by the one or more processors, cause the one or more processors to:

present a drop-down menu in the graphical user interface comprising a selectable list of display type values compatible with the first data item type.

13. The system of claim 12, wherein the instructions comprise further instructions that, upon execution by the one or more processors, cause the one or more processors to:

receive a second user selection of a third display type value from the selectable list of display type values;

in response to the second user selection, update the value of the display type property to the third display type value; and update the display element using the third display type value for the display type property.

14. The system of claim 10, wherein the instructions comprise further instructions that, upon execution by the one or more processors, cause the one or more processors to:

receive a second user selection of a second display element;

provide, via the graphical user interface, input options for the display properties for the second display element;

in response to receiving a selection of a second data item as a value for a data item source property of the second display element, generate the second display element for the second data item; and update the graphical user interface to display the second display element in addition to the display element.

15. The system of claim 10, wherein the instructions comprise further instructions that, upon execution by the one or more processors, cause the one or more processors to:

save, in the one or more memories, the display instructions to render the graphical user interface as a user customized dashboard.

16. The system of claim 10, further comprising:

a display;

wherein the instructions comprise further instructions that, upon execution by the one or more processors, cause the one or more processors to:

receive a selection of a user customized dashboard comprising second display instructions to render a graphical user interface comprising a plurality of display elements, wherein the display instructions were saved on a second system different from the system;

identify a size of the display; and automatically resize the plurality of display elements, modify position information associated with the plurality of display elements, or both to adapt to the size of the display.

17. The system of claim 10, wherein the instructions comprise further instructions that, upon execution by the one or more processors, cause the one or more processors to:

receive a user selection of a second data item of the plurality of data items, wherein the user selection is a drag-and-drop action, and the second data item is dropped onto the display element; and update the display element to display first data item values for the first data item and second data item values for the second data item.

18. A non-transitory computer-readable storage media device having program instructions stored thereon to facilitate visualization of an application associated with an industrial automation environment, wherein the program instructions, upon execution by one or more processors, cause the one or more processors to:

present, in a graphical user interface (GUI), a menu displaying a plurality of data items comprising real-time operational values corresponding to operations of a machine in the industrial automation environment;

receive a user selection comprising a drag-and-drop of a first data item of the plurality of data items from the menu to a dashboard of the GUI, wherein the first data item comprises a first data item type of a plurality of data item types;

in response to the drag-and-drop of the first data item, automatically generate a display element for the first data item, wherein:

the display element comprises a plurality of display properties, the plurality of display properties comprises a display type property having an automatically populated value of a first display type value selected from a plurality of display type values, wherein the first display type value corresponds to a graphical representation of a gauge visually depicting a first real-time operational data value of the machine, and the automatically populated value is based on a determination that the first data item type has a default display type value corresponding to the graphical representation of the gauge;

receive display instructions comprising:

an instruction to resize the display element to a smaller size, and position information that identifies where to display the display element;

determine that the smaller size is below a minimum threshold associated with the graphical representation of the gauge;

modify, in response to the determination, the value of the display type property from the first display type value to a second display type value associated with display of a numerical representation of the first real-time operational data value of the machine; and render, in the GUI, the display element according to the plurality of display properties wherein the display element is positioned in the GUI based on the position information.

19. The non-transitory computer-readable storage media device of claim 18, wherein the program instructions comprise further program instructions that, upon execution by the one or more processors, cause the one or more processors to:

continuously update the display element with real time operational data values.

20. The non-transitory computer-readable storage media device of claim 18, wherein the program instructions comprise further program instructions that, upon execution by the one or more processors, cause the one or more processors to:

present a drop-down menu in the graphical user interface comprising a selectable list of display type values compatible with the first data item type;

receive a second user selection of a third display type value from the selectable list of display type values;

in response to the second user selection, update the value of the display type property to the third display type value; and update the display element using the third display type value for the display type property.

* * * * *